United States Patent
Ueno et al.

(10) Patent No.: US 9,571,537 B2
(45) Date of Patent: Feb. 14, 2017

(54) CONTENT ACQUISITION DEVICE AND METHOD

(71) Applicant: FUJITSU LIMITED, Kawasaki-shi, Kanagawa (JP)

(72) Inventors: Hitoshi Ueno, Kawasaki (JP); Kenichi Abiru, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 14/615,548

(22) Filed: Feb. 6, 2015

(65) Prior Publication Data

US 2015/0256571 A1 Sep. 10, 2015

(30) Foreign Application Priority Data

Mar. 6, 2014 (JP) .................................. 2014-044308

(51) Int. Cl.
*H04L 29/06* (2006.01)
*H04L 29/08* (2006.01)

(52) U.S. Cl.
CPC ......... *H04L 65/403* (2013.01); *H04L 67/1008* (2013.01); *H04L 67/1029* (2013.01); *H04L 67/1014* (2013.01); *H04L 67/2842* (2013.01)

(58) Field of Classification Search
CPC ...... H04L 65/4084; H04L 67/10; H04L 51/10; H04L 67/02; H04N 21/4788
See application file for complete search history.

(56) References Cited

U.S. PATENT DOCUMENTS

| 8,141,078 | B2* | 3/2012 | Abernethy, Jr. ........ G06Q 10/06 718/102 |
| 2003/0105925 | A1* | 6/2003 | Yoshimura ........ G06F 17/30902 711/118 |
| 2008/0215748 | A1* | 9/2008 | Kagan .................. H04L 47/122 709/232 |
| 2010/0021130 | A1* | 1/2010 | Shiragaki ............... H04H 20/40 386/248 |
| 2010/0246401 | A1* | 9/2010 | Woundy ............. H04L 12/2801 370/236 |
| 2013/0117432 | A1* | 5/2013 | Jiang ....................... H04L 67/14 709/223 |
| 2013/0132469 | A1* | 5/2013 | Levicki ............... H04L 65/4084 709/203 |

FOREIGN PATENT DOCUMENTS

JP 2001-290787 10/2001

OTHER PUBLICATIONS

Patent Abstracts of Japan, Publication No. 2001-290787, published Oct. 19, 2001.

* cited by examiner

*Primary Examiner* — Peling Shaw
(74) *Attorney, Agent, or Firm* — Staas & Halsey LLP

(57) ABSTRACT

A content acquisition device includes a processor that executes a procedure. The procedure includes: acquiring group data to identify a group that a user belongs to; and based on a period of time needed to acquire content from each of a first data processing device that holds content shared by the group indicated by the group data, and a second data processing device that is in the process of acquiring the content from the first data processing device, selecting a data processing device from which to acquire the content.

20 Claims, 22 Drawing Sheets

| GROUP ID | CONTENT ID | SIZE (Mb) |
|---|---|---|
| Gr1 | abc | 50 |
| Gr2 | def | 30 |
| ⋮ | ⋮ | ⋮ |

~100

| CONTENT ID | CS-ID |
|---|---|
| abc | CS201 |
| abc | CS204 |
| ⋮ | ⋮ |

| CS-ID | THROUGHPUT (Mbps) |
|---|---|
| CS201 | 2 |
| CS202 | 2 |
| CS203 | 5 |
| CS204 | 5 |
| CS205 | 25 |

| CONTENT ID | CS-ID | ACQUISITION COMPLETION SCHEDULED TIME |
|---|---|---|
| abc | CS205 | 11:20:20 |
| ... | ... | ... |

| MAXIMUM TIME FOR PRE-DISTRIBUTION | 15 SECONDS | ~104B |
|---|---|---|

FIG.24

| CS-ID | THROUGHPUT (Mbps) | NUMBER OF HOPS |
|---|---|---|
| CS201 | 2 | 7 |
| CS202 | 2 | 7 |
| CS203 | 5 | 5 |
| CS204 | 5 | 5 |
| CS205 | 25 | 2 |

| COUNT DURATION | 5 MINUTES |
|---|---|
| NUMBER OF NOTIFICATIONS UPPER LIMIT | 3 |

| CS-ID | RECEIPT TIME |
|---|---|
| CS205 | 11:20:10 |
| CS204 | 11:20:10 |
| CS203 | 11:18:45 |
| CS204 | 11:18:30 |
| CS204 | 11:18:05 |
| CS204 | 11:17:40 |
| CS201 | 11:17:15 |

~105

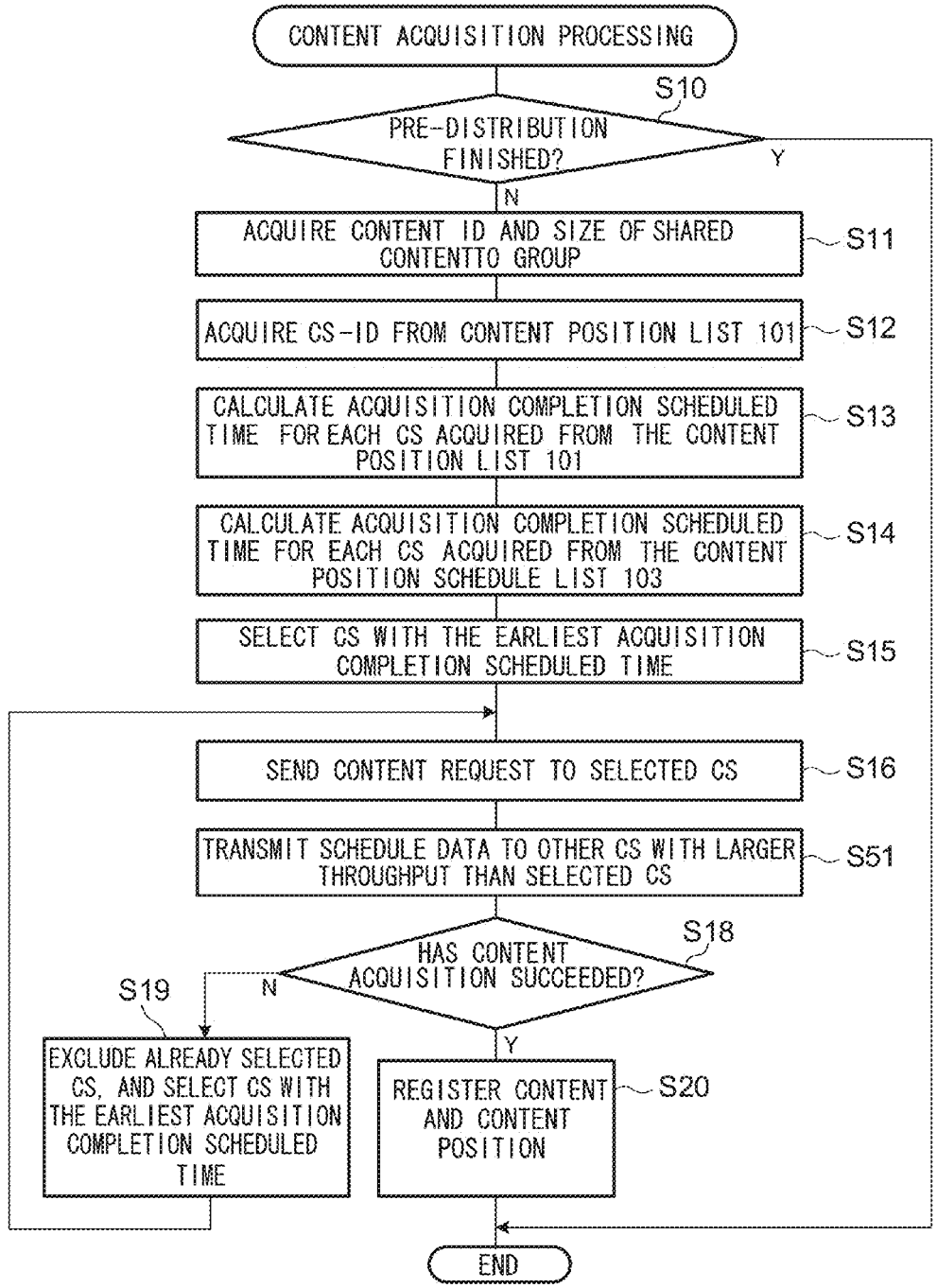

CONTENT ACQUISITION DEVICE AND METHOD

CROSS-REFERENCE TO RELATED APPLICATION

This application is based upon and claims the benefit of priority of the prior Japanese Patent Application No. 2014-044308, filed on Mar. 6, 2014, the entire contents of which are incorporated herein by reference.

FIELD

The embodiments discussed herein are related to a recording medium at which a content acquisition program is recorded, a content acquisition device, and a content acquisition method.

BACKGROUND

Recently, services, such as SNS, that share content between particular users are increasing. Moreover, as a result of it now being possible to generate high picture quality content due to the increasingly high functionality of terminals, the size of shared content is ballooning, with a tendency for the waiting times for uploading and downloading content to get longer.

Methods that employ cache servers are widely utilized as methods to shorten the waiting times for uploading and downloading content. For example, for content accessed by many unspecified users under a cache server, frequently-accessed content is distributed to that cache server. This enables the time taken to download content to be shortened for users under that cache server.

There has also been a proposal, when transmitting data, to select, from plural cache servers, a cache server that has a light load and a short delay when communicating with a client, and to distribute data from that cache server to the client.

RELATED PATENT DOCUMENTS

Japanese Laid-Open Patent Publication No. 2001-290787

SUMMARY

According to an aspect of the embodiments, a non-transitory recording medium stores a content acquisition program that causes a computer to execute a process. The process includes: acquiring group data to identify a group that a user belongs to; based on a period of time needed to acquire content from each of a first data processing device that holds content shared by the group indicated by the group data, and a second data processing device that is in the process of acquiring the content from the first data processing device, selecting a data processing device from which to acquire the content, from the first data processing device and the second data processing device; and acquiring the content from the selected data processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a block diagram illustrating a schematic configuration of a cache server according to a first and a fifth exemplary embodiment;

FIG. 6 is a diagram illustrating an example of a speed list in the first exemplary embodiment;

FIG. 7 is a diagram illustrating an example of a content position schedule list;

FIG. 10 is a diagram to explain selecting a cache server to acquire content from;

FIG. 12 is a diagram to explain selection of a cache server to acquire content from;

FIG. 13 is a diagram to explain selection of a cache server to acquire content from;

FIG. 23 is a diagram illustrating an example of a setting data table of the third exemplary embodiment;

FIG. 24 is a diagram illustrating an example of a speed list of the third exemplary embodiment;

FIG. 27 is a diagram illustrating an example a setting data table in the fourth exemplary embodiment;

FIG. 28 is a diagram illustrating an example of a schedule data count list;

FIG. 31 is a flowchart illustrating an example of content acquisition processing in the fifth exemplary embodiment.

DESCRIPTION OF EMBODIMENTS

Detailed explanation follows regarding an example of an exemplary embodiment according to technology disclosed herein, with reference to the drawings. In the present exemplary embodiment, explanation follows regarding a case in which the technology disclosed herein is applied to a content acquisition system in which content that is shared by a group containing plural users is distributed in advance to a cache server nearby a user. More specifically, this is a system in which, in preparation for content requests from users, content shared by the group a user belongs to is distributed in advance to a cache server that has received a group registration (subscribe) from the user.

First Exemplary Embodiment

Figure 1:
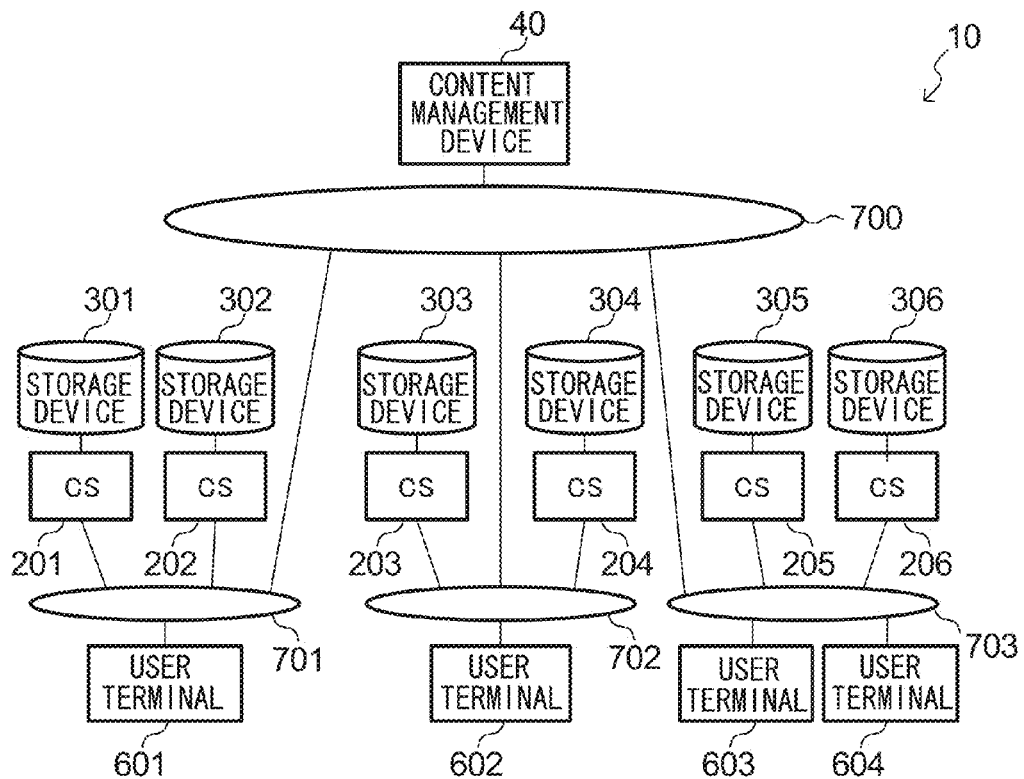
FIG. 1 is a block diagram illustrating a schematic diagram of a content acquisition system.

As illustrated in FIG. 1, a content acquisition system 10 according to the first exemplary embodiment includes a content management device 40, plural cache servers (CS) 201 to 206, plural storage devices 301 to 306, and plural user terminals 601 to 604. The content management device 40 is connected to a relay network 700. The relay network 700 is connected to each of local networks 701, 702, 703. Generally there are more relay devices provided in a relay network than the number of relay devices provided in a local network. Namely, the communication between local networks through a relay network has a higher communication cost than communication within the local network due to the greater number of relay devices communication passes through.

In the example illustrated in FIG. 1, each of the cache servers 201 to 206, and each of the storage devices 301 to 306, are connected one-to-one. The cache servers 201, 202 are connected to the local network 701. The cache servers 203, 204 are connected to the local network 702. The cache servers 205, 206 are connected to the local network 703.

The configuration of each of the cache servers 201 to 206 is similar to each other and so in the following explanation reference will be made to "cache server 20n" when not discriminating between the cache servers 201 to 206. The configuration of each of the storage devices 301 to 306 is also similar to each other, and so in the following explanation reference will be made to "storage device 30n" when not discriminating between the storage devices 301 to 306.

In the example of FIG. 1, the user terminal 601 is connected to the local network 701, and the user terminal 602 is connected to the local network 702, and the user terminals 603, 604 are connected to the local network 703. However, each of the user terminals 601 to 604 are portable terminals such as a mobile phone, a smartphone, a tablet, or a notebook computer, and are connectable to any of the local networks 701, 702, 703. In the following explanation reference will be made to "user terminal 60n" when not discriminating between the user terminals 601 to 604.

Note that the network configuration of the content acquisition system 10 is not limited to that of the example of FIG. 1. The number of cache servers, the number of storage devices, and the number of user terminals included in the content acquisition system 10 are also not limited to those of the example of FIG. 1.

Figure 2:
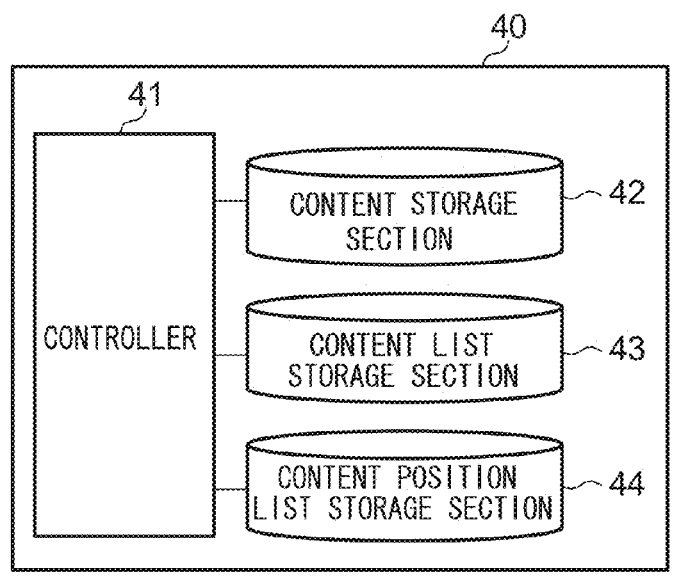
FIG. 2 is a block diagram illustrating a schematic configuration of a content management device.

The content management device 40, as illustrated in FIG. 2, includes a controller 41, a content storage section 42, a content list storage section 43, and a content position list storage section 44.

Plural content is stored in the content storage section 42 for distribution to users. The content is, for example, image data, video data, music data, or text data.

Based on the history of content previously accessed by users, the controller 41 collects together users into a single group of users with shared access to the same content. The controller 41 makes content with shared access by users belonging to each of the groups, shared content for that group, and creates a content list of shared content data registered for each of the groups.

Figures 3, 4:
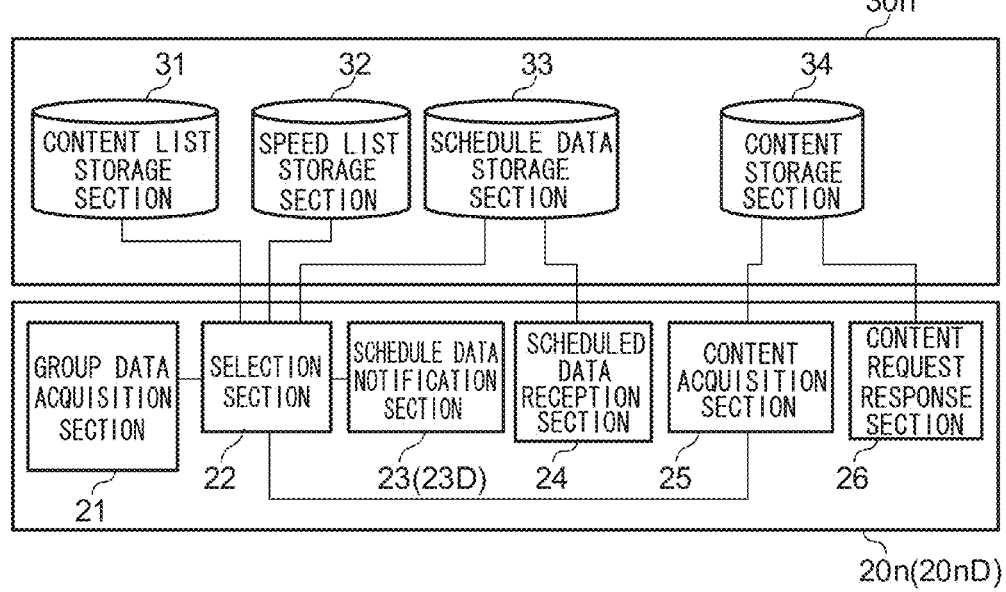
FIG. 3 is a diagram illustrating an example of a content list.
FIG. 4 is a diagram illustrating an example of a content position list.

FIG. 3 illustrates an example of a content list 100. In the example of FIG. 3, a group ID that is identification data of that group, content ID that is identification data of content shared by that group, and size of the shared content, are associated with each other for each of the groups. Namely, the entry <Gr1, abc, 50 Mb> in the content list 100 illustrated in FIG. 3 means that "the group with group ID=Gr1 has shared access to the content with content ID=abc having a file size of 50 Mb". The controller 41 stores the created content list 100 in the content list storage section 43, and also distributes the content list 100 to each of the cache servers 20n.

The controller 41 distributes each of the plural contents stored in the content storage section 42 to any of the cache servers 20n. One content may be distributed to one cache server, or may be distributed to plural cache servers. The distribution of content to the cache servers 20n means that the content is stored in a content storage section 34 (described in detail below) of the storage device 30n according to the cache server 20n.

The controller 41 creates a content position list indicating which content was distributed to which cache server 20n, namely the position of each content. FIG. 4 illustrates an example of a content position list 101. In the example of FIG. 4, the content ID of the content, and the cache server ID (CS-ID) that is identification data of the cache server to which that content has been distributed, are associated with each other. For example, there are two entries in the content position list 101 illustrated in FIG. 4, <abc, CS201> and <abc, CS204>. This means that "the content of content ID=abc is held on cache servers with CS-ID=CS201 and CS204". The controller 41 stores the created content position list 101 on the content position list storage section 44.

When a change has occurred in the content distributed to each of the cache servers 20n, the controller 41 acquires data from each of the cache servers 20n by processing, described below. The controller 41 then updates the content position list 101 stored on the content position list storage section 44 based on acquired data.

Detailed explanation follows regarding the cache servers 20n and the storage devices 30n. As illustrated in FIG. 5, the storage devices 30n each include a content list storage section 31, a speed list storage section 32, a schedule data storage section 33, and the content storage section 34.

The content list 100 (for example FIG. 3) distributed from the content management device 40 is stored in the content list storage section 31.

The speed list indicating the communication state between the corresponding cache server 20n and each of the other cache servers is stored in the speed list storage section 32. The example illustrated in FIG. 6 illustrates a speed list 102 stored on the speed list storage section 32 of the cache server 206. In the example of FIG. 6, the CS-ID of another cache server, and a throughput (Mbs) expressing the data transmission volume per unit time with the other cache server, are associated with each other. Namely, the entry <CS201, 2 Mbps> in the speed list 102 illustrated in FIG. 6 means that "the throughput with the cache server with CS-ID=CS201 is 2 Mbps".

There are as many entries recorded in the speed list 102 as the number of other cache servers. The value of the throughput recorded in the speed list 102 is the throughput as viewed from the cache server 20*n* holding the speed list 102, and the values in the speed list 102 held by each of the cache servers 20*n* are different for each of the cache servers 20*n*. The speed list 102 held by the cache server 20*n* is the speed list 102 stored in the speed list storage section 32 of the storage device 30*n* corresponding to the cache server 20*n*.

A content position schedule list recorded with entries of schedule data received from another cache server is stored in a scheduled reception section 24, described below, in the schedule data storage section 33. An example of a content position schedule list 103 is illustrated in FIG. 7. A content ID of content being acquired, a CS-ID of a cache server acquiring that content, and an acquisition completion scheduled time, are associated with each other in the example illustrated in FIG. 7. Detailed explanation follows, however, briefly the schedule data is data of the content acquisition completion scheduled time notified by another cache server during acquisition of the content. For example, there is an entry <abc, CS205, 11:20:20> present in the content position schedule list 103 illustrated in FIG. 7. This means that "the content of content ID=abc is scheduled to complete acquisition at 11:20:20 in the cache server of CS-ID=CS205". Namely, each of the entries of the content position schedule list 103 indicates a scheduled position of each content at acquisition completion scheduled time.

Content distributed from the content management device 40 is stored in the content storage section 34.

The cache server 20*n* includes a group data acquisition section 21, a selection section 22, a schedule data notification section 23, a scheduled data reception section 24, a content acquisition section 25, and a content request response section 26.

Figure 8:
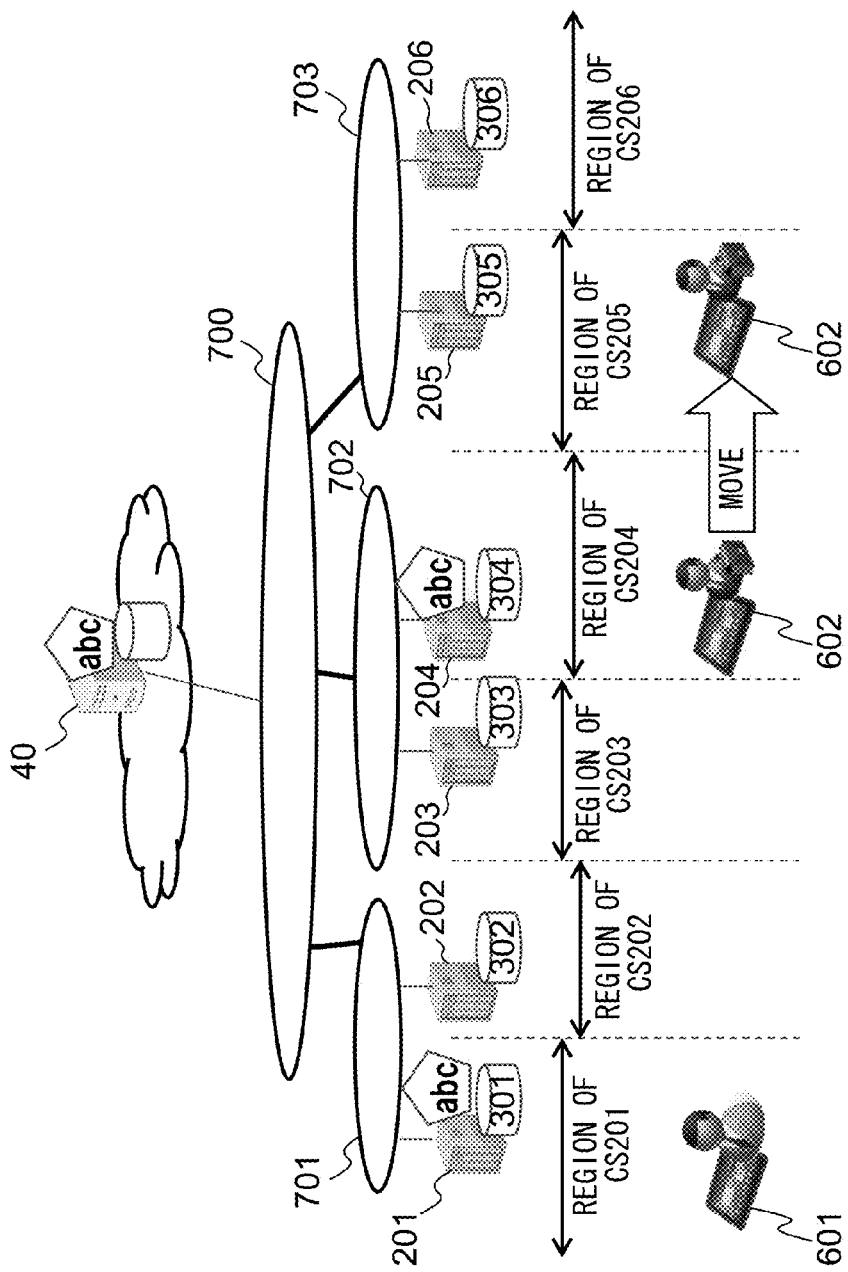
FIG. 8 is a schematic diagram to explain group registration.

The group data acquisition section 21 acquires group data from the user terminal 60*n* under its own device. For example, as illustrated in FIG. 8, regions to be handled by each of the cache servers 20*n* are determined according to the physical position of the cache server 20*n*. In a region of a given cache server 20*n*, group registration (subscribe) is performed by user terminals 60*n* to the cache server 20*n* corresponding to that region by operation of the user terminals 60*n*. The cache server 20*n* corresponding to that region is a nearby cache server to the user terminals 60*n*. The group registration may be performed, for example, by transmitting a message including group data of the group to which the user belongs to the nearby cache server when a target application is executed by the user terminal 60*n*. A state of group registration of the user terminal 60*n* to the nearby cache server 20*n* means that the user terminal 60*n* is under that cache server 20*n*.

For example, in the example illustrated in FIG. 8, the user terminal 601 operating in a region of the cache server 201 is under the cache server 201. Sometimes the user terminal 602 under the cache server 204 enters the region of the cache server 205 due to moving. In such a case, the user terminal 602 moves away from being under the cache server 204 and becomes under the cache server 205.

Explanation follows regarding the mechanism by which the group data transmitted from the user terminal 60*n* here is delivered to the nearby cache server. For example, an application activated by a user terminal 60*n* (referred to below as a terminal app) is able to utilize a normal Domain Name Service (DNS) enquiry. A terminal app normally performs a DNS enquiry using the connection destination URL pre-set in the terminal app as a key, acquires the IP address of the connection destination, and transmits a message to the IP address.

Figure 9:
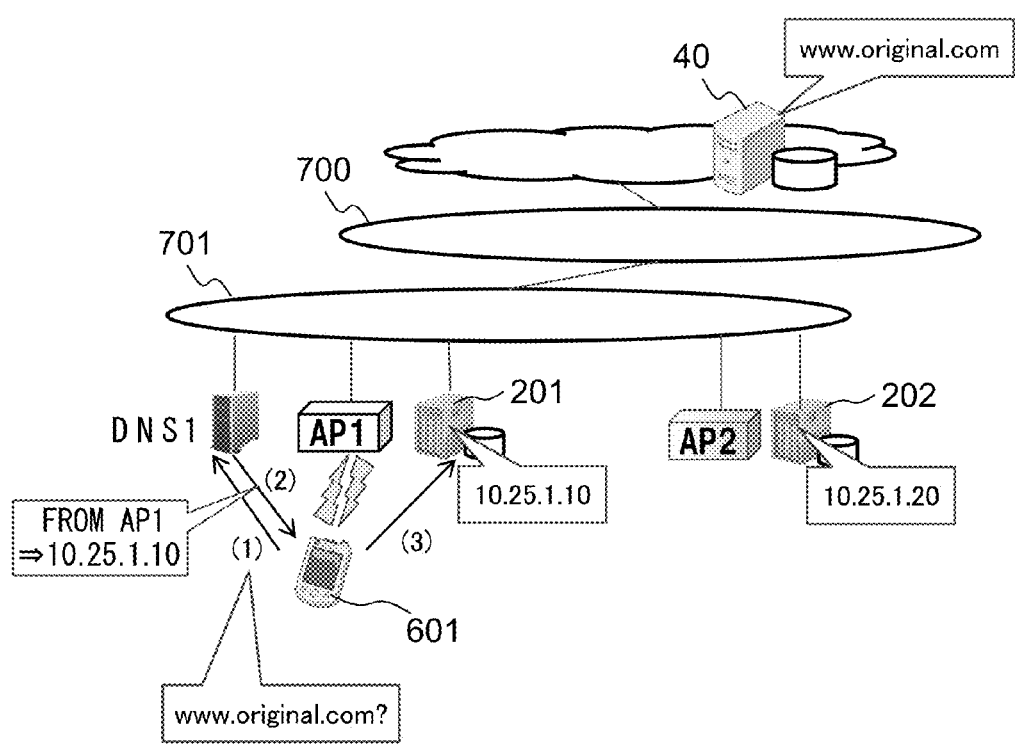
FIG. 9 is a schematic diagram to explain group registration.

For example, as illustrated in FIG. 9, the user terminal 601 first submits an enquiry ((1) in FIG. 9) to the DNS server using the URL of the content management device 40 as the key. The access port (AP) and the IP address of a near cache server to the AP, are associated in the DNS server. The DNS server returns the IP address (10.25.1.10) of the near user terminal 201 to the connection AP of the user terminal 601 ((2) in FIG. 9). Group registration is thereby performed in the nearby user terminal 201 of the user terminal 601 ((3) in FIG. 9).

As a method to ascertain the connection AP of a user terminal, the DNS server may, for example, get to know the connection AP from the transmission source IP addresses by determining a range of IP addresses to allocated to user terminals for each connection AP.

Moreover, there is a need to perform group registration to a new nearby cache server when the user terminal 602 has moved as illustrated in FIG. 8 while in an already activated state of the terminal app. This method monitors with the terminal app the ID of the connection AP (base station ID and wireless basic service set ID (BSSID), normally MAC address of connection AP). Then group data is transmitted to the nearby cache server when updating the ID of the connection AP.

In the present exemplary embodiment, explanation is given of a case in which the group data acquisition section 21 receives a message including a group ID that is identification data of the group as group data from the user terminal 60*n*, however there is no limitation thereto. For example, the group data acquisition section 21 may receive the identification data of a user (for example a user ID). In such cases, the group data acquisition section 21 is pre-saved with a correspondence list between user identification data and group data, enabling group data of that user to be acquired from a received user identification data and the correspondence list.

Based on the group ID acquired by the group data acquisition section 21, the selection section 22 selects content to acquire from one of the other cache servers when the shared content to the group indicated by this group ID is not distributed to its own device. The selection section 22 selects the cache server with the earliest content acquisition completion.

Figure 10:
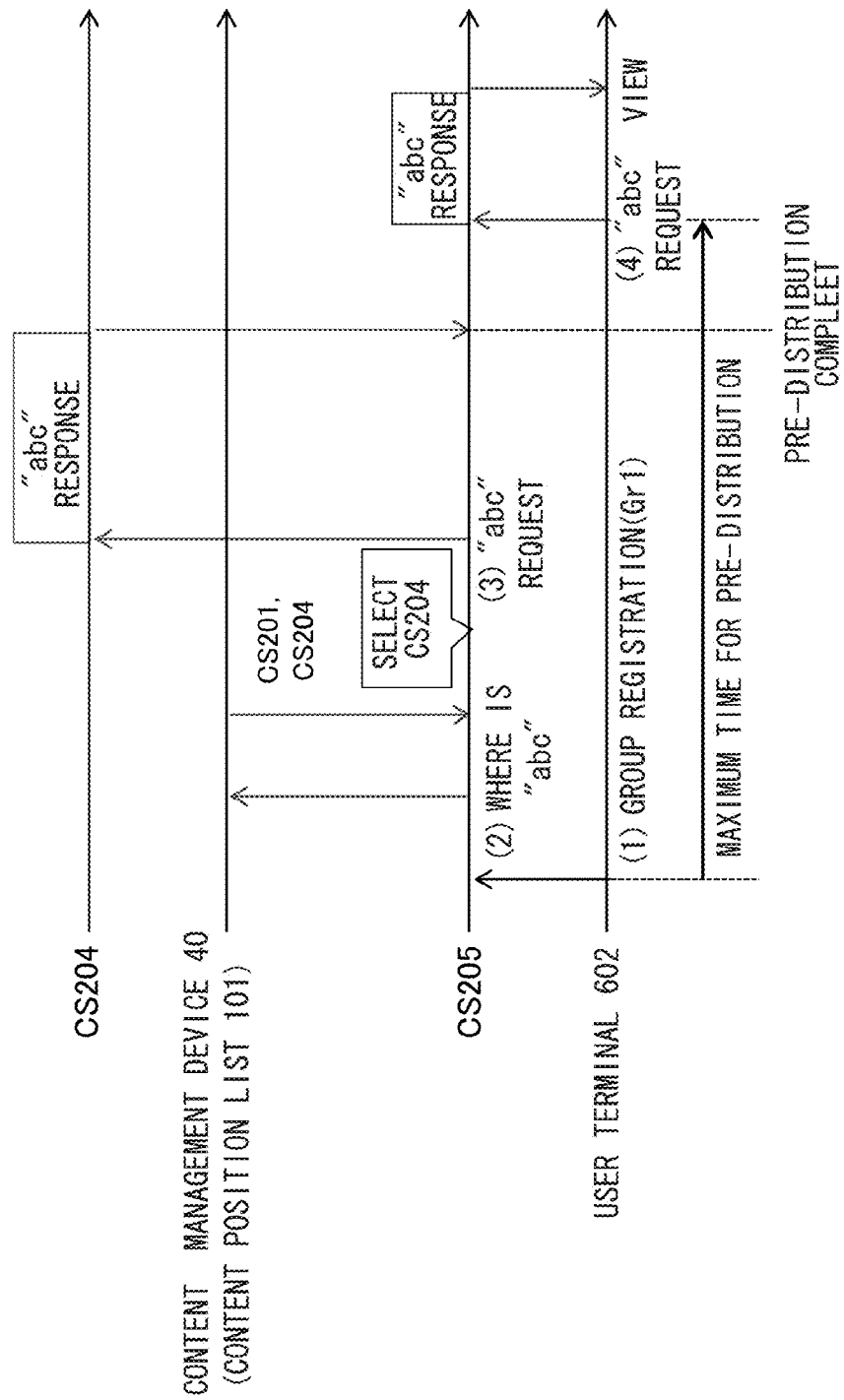

More specifically, the selection section 22 first references the content list 100 stored in the content list storage section 31 and acquires content ID of shared content corresponding to the content ID. For example, as illustrated in FIG. 10, based on the group registration from the user terminal 602 to the cache server 205, the group ID=Grl is acquired by the group data acquisition section 21 of the cache servers 205 ((1) in FIG. 10). Using the group ID=Grl as a key, the selection section 22 of the cache server 205 acquires content ID=abc, and content size=50 Mb from the content list 100 stored in the content list storage section 31, for example as illustrated in FIG. 3.

The selection section 22 uses the acquired content ID as a key to interrogate the content management device 40 for the position of content with that content ID ((2) in FIG. 10). The content management device 40 returns to the cache server 20n the content position by referencing the content position list 101 stored in the content position list storage section 44. For example, the content management device 40 receives interrogation from the cache server 205 for the position of the content of content ID=abc. Based on the content position list 101, such as for example illustrated in FIG. 4, the content management device 40 transmits the CS-ID=CS201, CS204 of the cache servers 201, 204 as content positions of the content ID=abc to the cache server 205.

The selection section 22 acquires the content position transmitted from the content management device 40. For each acquired content position, namely for each cache server distributed with the shared content, the selection section 22 calculates the acquisition completion scheduled time for a case in which the content is acquired from that cache server.

More specifically, the selection section 22 uses the acquired CS-ID as a key to acquire from the speed list 102 the throughput between each of the cache server at the content positions and its own device. Then, based on the content size and the throughput with each of the cache servers, acquired from the content list 100, the selection section 22 calculates the acquisition time needed to acquire the content from each of the cache servers. The selection section 22 takes the time expressed by the current time+the acquisition time as the acquisition completion scheduled time.

For example, a throughput=2 Mbps with the cache server 201, and a throughput=5 mps with the cache server 204 is acquired from the speed list 102 illustrated in FIG. 6. The content size of the content ID=abc is 50 Mb, and so the acquisition time from the cache server 201 is 25 seconds, and the acquisition time from the cache server 204 is 10 seconds. Thus if the current time is 11:20:15, then the acquisition completion scheduled time from the cache server 201 is 25 seconds after 11:20:15, i.e. 11:20:40, and the acquisition completion scheduled time from the cache server 204 is 10 seconds after 11:20:15, i.e. 11:20:25 from the cache server 204.

As illustrated in FIG. 10, the aim is to pre-distribute the content from the nearby cache server 20n to the user terminal 60n in the interval from the terminal app activation time ((1) in FIG. 10) to the request for content from the user terminal 60n ((4) in FIG. 10). Namely, the time from the terminal app activation time until request of content from the user terminal 60n is the upper limit of time for pre-distribution. Now consider selection of acquisition of content ((3) of FIG. 10) from the cache server 204 having the earlier acquisition completion scheduled time from out of the cache servers 201, 204 currently holding the shared content.

However, depending on the situation, even if the cache server having the shortest acquisition time is selected from out of the selects contents currently holding the shared content, it sometimes takes time to acquire the content. For example, when plural cache servers are in the process of acquiring content from the same cache server.

Figure 11:
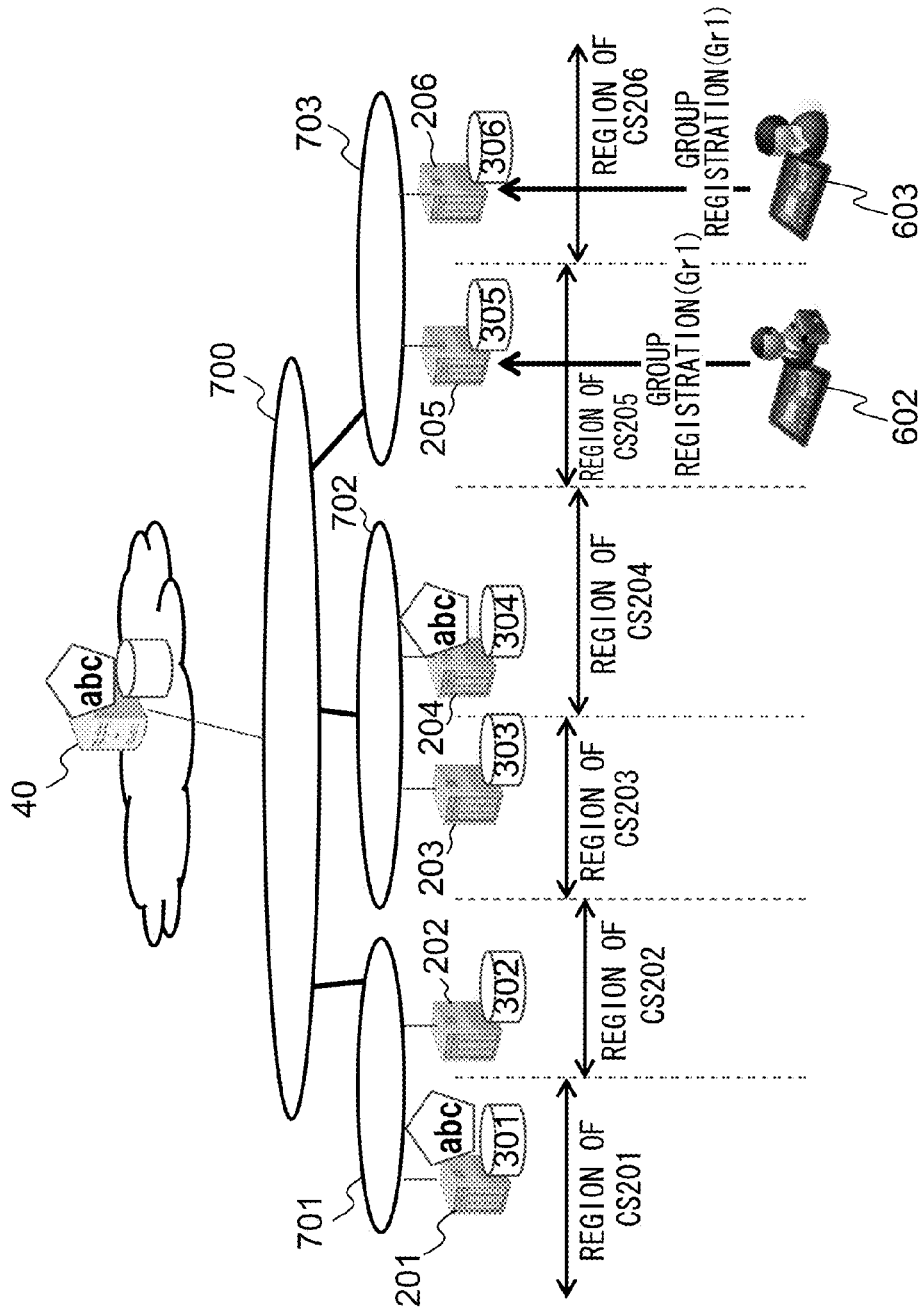
FIG. 11 is a schematic diagram to explain group registration.
Figure 12:
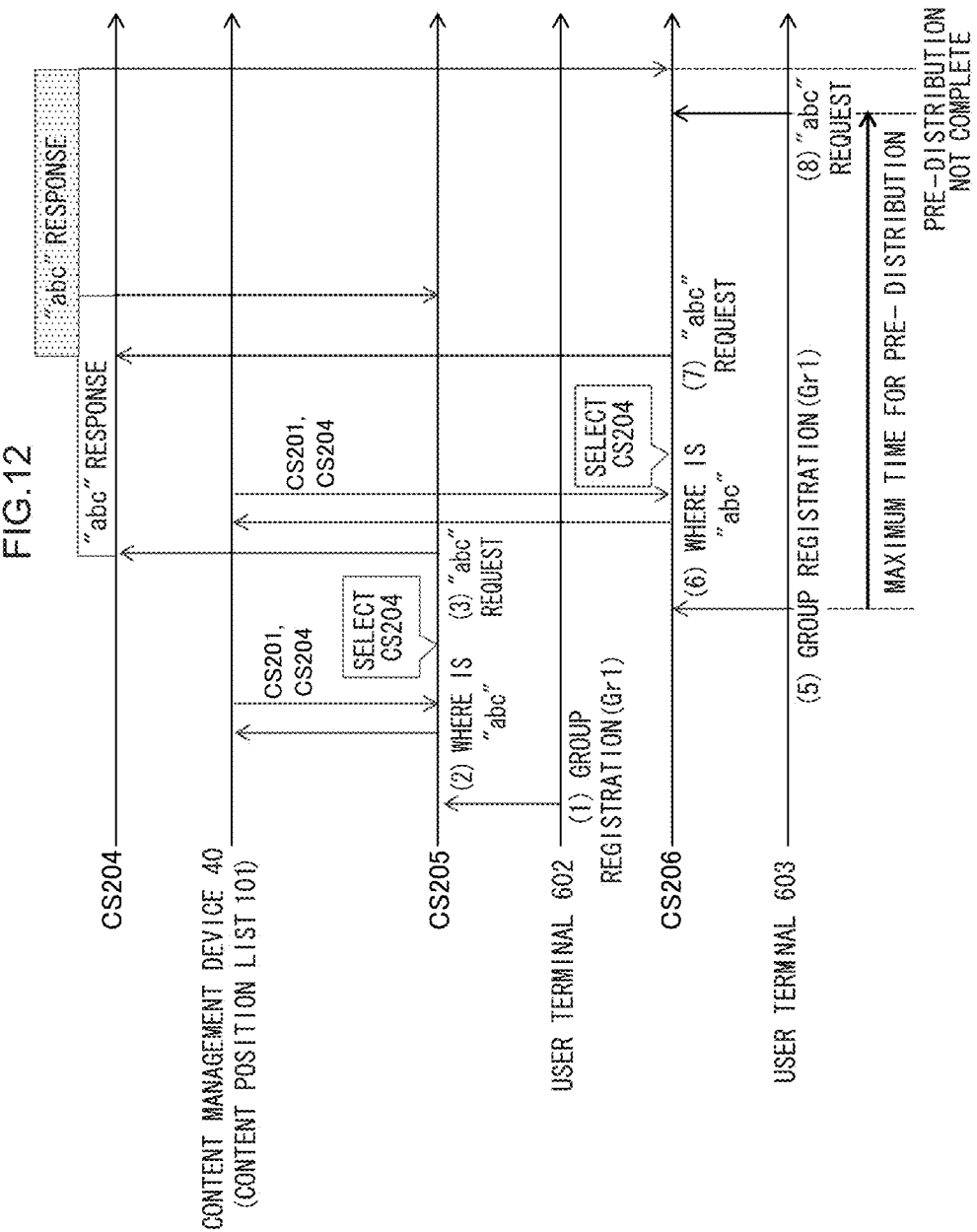

More specifically, for example as illustrated in FIG. 11, consider a case in which, depending on the different user belonging to the same group (group ID=Gr1), there is a short time difference in group registration between the respective user terminal 602 and the user terminal 603. In such a case, group registration from the respective user terminal 602 and the user terminal 603 is performed to the respective different cache servers 205, 206 under the same local network 703. In this case, for example as illustrated in FIG. 12, for the group registration from the user terminal 602, the cache server 205 acquires content from the cache server 204, similarly to in the case illustrated in FIGS. 10 ((1) to (3) in FIG. 12). For the group registration from the user terminal 603, performed at a short time difference from the group registration from the user terminal 602, the cache server 206 would acquire content from the cache server 204 ((5) to (7) in FIG. 12).

In this manner, there is a possibility that, for example, near cache servers might acquire the same content from the same other cache server when the cache servers are under the same local network. In such a case, as illustrated in FIG. 12, sometimes it would take time to acquire the content due to raising the processing load of the cache server 204 and the network processing load. Therefore sometimes pre-distribution of the content to the nearby cache server 206 of the user terminal 603 is not completed by the time of content request from the user terminal 603 ((8) of FIG. 12).

In such a case, it would have been faster to wait until acquisition completion of the content by the cache server 205, then to acquire the content from the cache server 205 for the user terminal 603. Thus in the selection section 22 of the present exemplary embodiment, the cache server giving the earliest acquisition completion scheduled time is selected from not only the cache servers currently holding the shared content, but also from the cache servers currently in the process of acquiring the shared content.

More specifically, the selection section 22 references the content position schedule list 103 stored in the schedule data storage section 33, and acquires data of the other cache servers in the process of acquiring the content desired for acquisition, and the acquisition completion scheduled time for those cache servers. For example, consider a case in which the cache server 206 references the content position schedule list 103 such as that illustrated in FIG. 7. In such a case, the selection section 22 of the cache server 206 uses the content ID=abc as a key to acquire the CS-ID=CS205 of the cache server in the process of acquiring the content, and the corresponding acquisition completion scheduled time=11:20:20.

The selection section 22 calculates the acquisition time to acquire the content from the cache server acquired from the content position schedule list 103. The acquisition time is calculated in a similar manner to the calculation of acquisition time for the cache server acquired from the content position list 101 as described above, and may be calculated from the throughput and the size of the content. The selection section 22 then takes the time expressed by the acquisition completion scheduled time acquired from the content position schedule list 103+the acquisition time as the acquisition completion scheduled time from that cache server.

For example, the selection section 22 of the cache server 206 acquires the cache server 205 and the throughput=25 Mbps from the speed list 102 illustrated in FIG. 6. The size of the content of the content ID=abc is 50 Mb, and so the acquisition time from the cache server 205 is 2 seconds. Thus the acquisition completion scheduled time from the cache server 205 is 2 seconds after 11:20:20, which is 11:20:22.

The selection section 22 selects the cache server with the earliest acquisition completion scheduled time from out of the cache servers acquired from the content position list 101, and the cache servers acquired from the content position schedule list 103. In the above example, the acquisition completion scheduled time from the cache server 201 is 11:20:40, the acquisition completion scheduled time from the cache server 204 is 11:20:25, and the acquisition completion scheduled time from the cache server 205 is 11:20:22. The selection section 22 accordingly selects the cache server 205.

Figure 13:
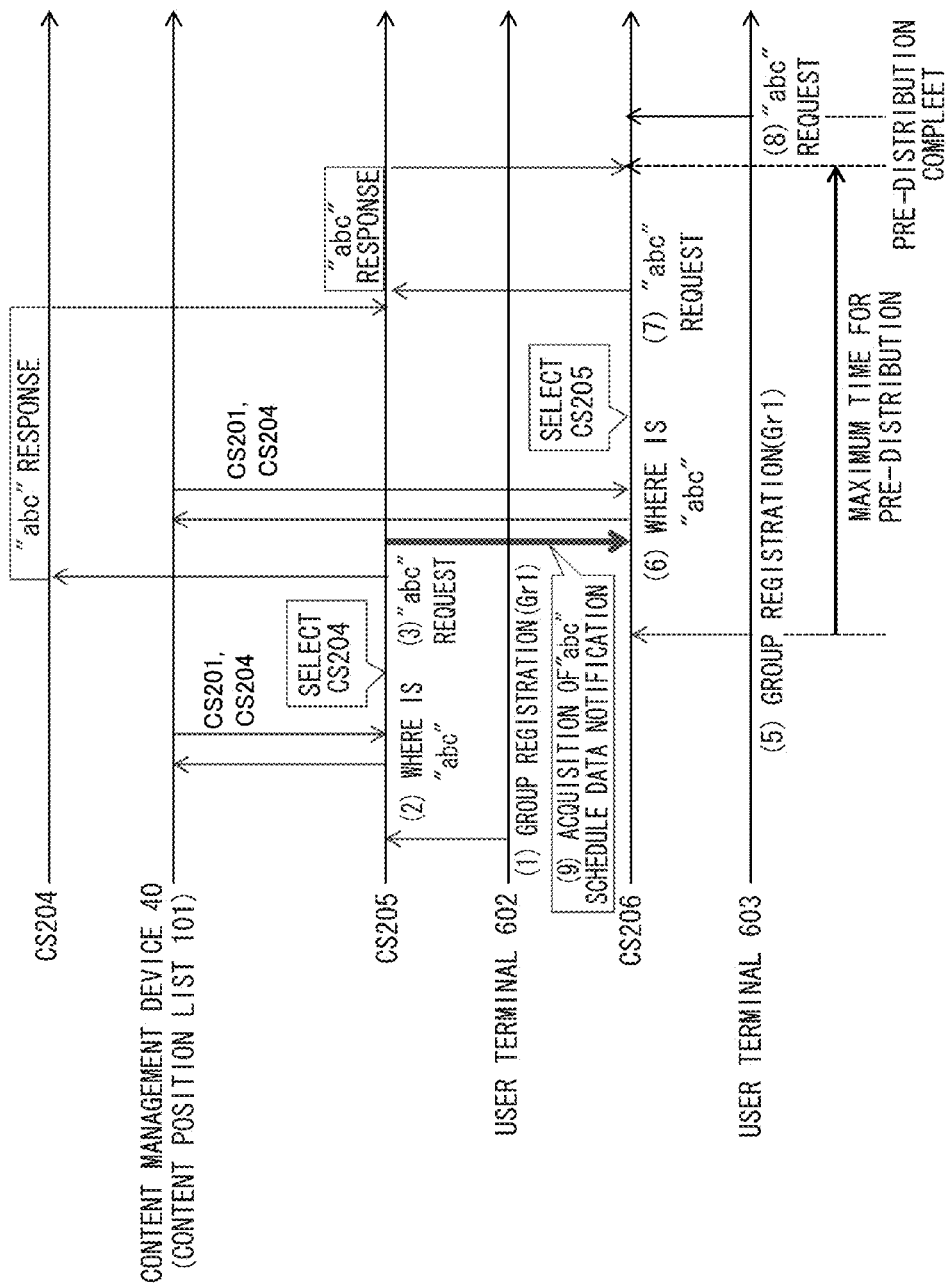

Thus, as illustrated in FIG. 13, selection is made to wait until acquisition is complete from the cache server currently in the process of acquiring the content, and then acquire the content from that cache server, rather than from a cache server currently holding the content ((7) of FIG. 13).

The schedule data notification section 23 generates schedule data that is data of the acquisition completion scheduled times of the content, and notifies other cache servers by multi-address transmission ((9) of FIG. 13). The schedule data notification section 23 enables, for example, the generation of schedule data <abc, CS205, 11:20:20> including the content ID of the content in the process of being acquired, the CS-ID of its own device, and the acquisition completion scheduled time of the content in its own device. The acquisition completion scheduled time computed for the cache server selected by the selection section 22 may be employed as the acquisition completion scheduled time.

The scheduled data reception section 24 receives the schedule data notified from the other cache server, and adds the received schedule data as an entry to the content position schedule list 103 stored in the schedule data storage section 33.

The content acquisition section 25 requests distribution of the content by, for example, transmitting the content ID of the desired content to the cache server selected by the selection section 22. The content acquisition section 25 acquires the content distributed from the other cache servers in response to the content request, and stores the content in the content storage section 34.

When acquisition of the content is complete, the content acquisition section 25 notifies the content management device 40 that the content has been distributed to its own device. For example, the content acquisition section 25 transmits to the content management device 40 data <abc, CS5> including the content ID of the content that has completed acquisition, and the CS-ID of its own device. The entry <abc, CS5> is thereby added to the content position list 101 stored in the content position list storage section 44 of the content management device 40.

When in receipt of a request for content from another cache server, the content request response section 26 acquires corresponding content from the content storage section 34, and transmits the content to the requesting cache server as a response to the content request.

Figure 14:
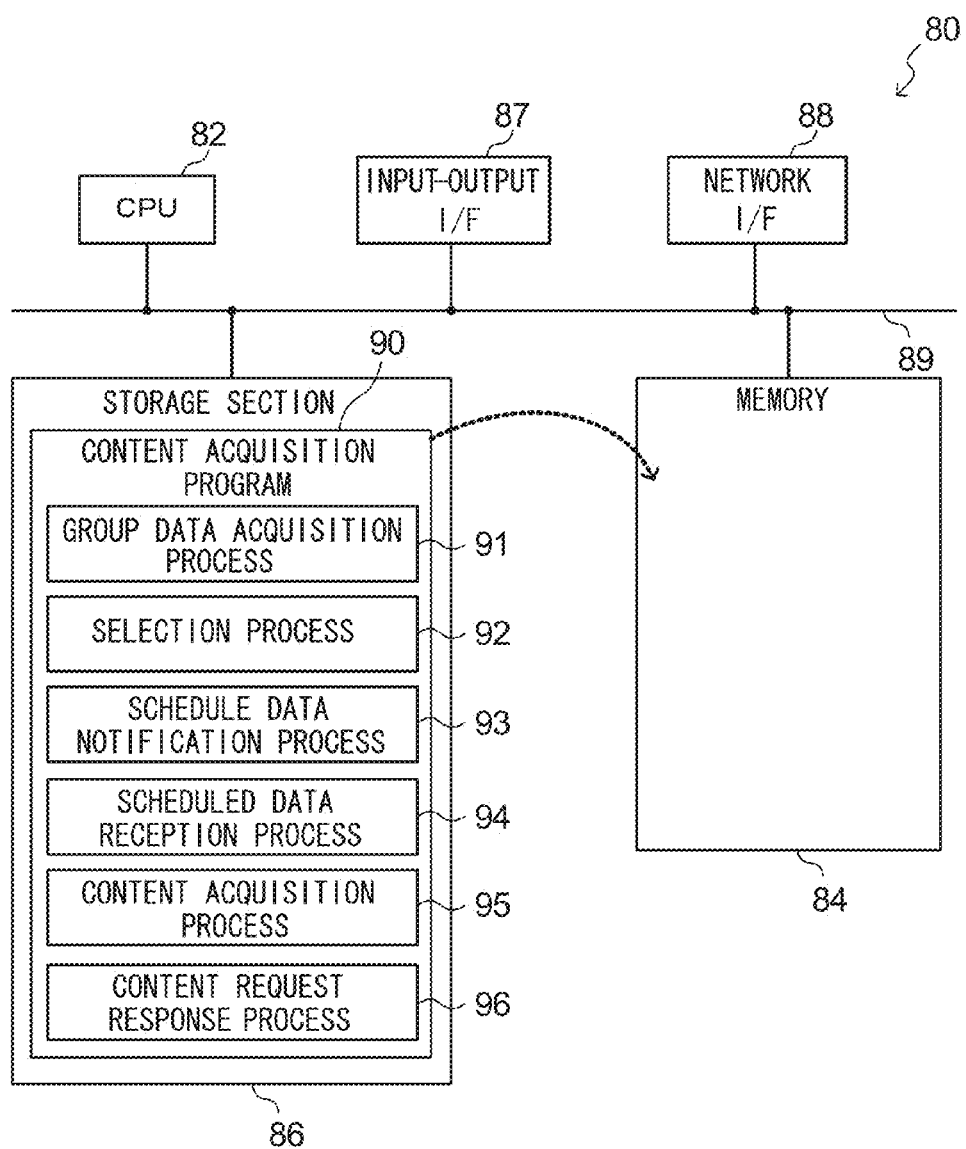
FIG. 14 is a block diagram illustrating a schematic configuration of a computer that functions as a cache server.

The cache server 20n may, for example, be implemented by a computer 80, as illustrated in FIG. 14. The computer 80 includes a CPU 82, memory 84, a nonvolatile storage section 86, an input-output interface (I/F) 87, and a network I/F 88. The CPU 82, the memory 84, the storage section 86, the input-output I/F 87, and the network I/F 88 are connected together by a bus 89.

The computer 80 is also connected to the storage device 30n through the network I/F 88. The computer 80 is also connected to one of the local networks 701, 702, 703 through the network I/F 88.

The storage section 86 may be implemented by a Hard Disk Drive (HDD), a flash memory, or the like. A content acquisition program 90 to make the computer 80 function as the cache server 20n is stored on the nonvolatile storage section 86, serving as a storage medium. The CPU 82 reads the content acquisition program 90 from the storage section 86, expands the content acquisition program 90 into the memory 84, and sequentially executes the processes of the content acquisition program 90.

The content acquisition program 90 includes a group data acquisition process 91, a selection process 92, a schedule data notification process 93, a scheduled data reception process 94, a content acquisition process 95, and a content request response process 96. The CPU 82 operates as the group data acquisition section 21 illustrated in FIG. 5 by executing the group data acquisition process 91. The CPU 82 operates as the selection section 22 illustrated in FIG. 5 by executing the selection process 92. The CPU 82 operates as the schedule data notification section 23 illustrated in FIG. 5 by executing the schedule data notification process 93. The CPU 82 operates as the scheduled data reception section 24 illustrated in FIG. 5 by executing a scheduled data reception process 94. The CPU 82 also operates as the content acquisition section 25 illustrated in FIG. 5 by executing the content acquisition process 95. The CPU 82 operates as the content request response section 26 illustrated in FIG. 5 by executing the content request response process 96. The computer 80 executing the content acquisition program 90 accordingly functions as the cache server 20n.

The content management device 40, and each of the user terminals 60n, may also be implemented by computers including a CPU, memory, a storage section, an input-output I/F, a network I/F, and a bus. The cache servers 20n, the content management device 40, and the user terminals 60n may also be implemented with, for example, a semiconductor integrated circuit, and more specifically with an Application Specific Integrated Circuit (ASIC) or the like.

Explanation next follows regarding operation of the content acquisition system 10 according to the first exemplary embodiment. When group registration is performed from a user terminal 60n, the nearby cache server 20n to the user terminal 60n executes the content acquisition processing illustrated in FIG. 15. When the schedule data is received from another cache server, the cache server 20n executes the scheduled data reception processing illustrated in FIG. 16. On receipt of the content ID as a content request for content from another cache server, the cache server 20n executes the content distribution processing illustrated in FIG. 17.

Figure 15:
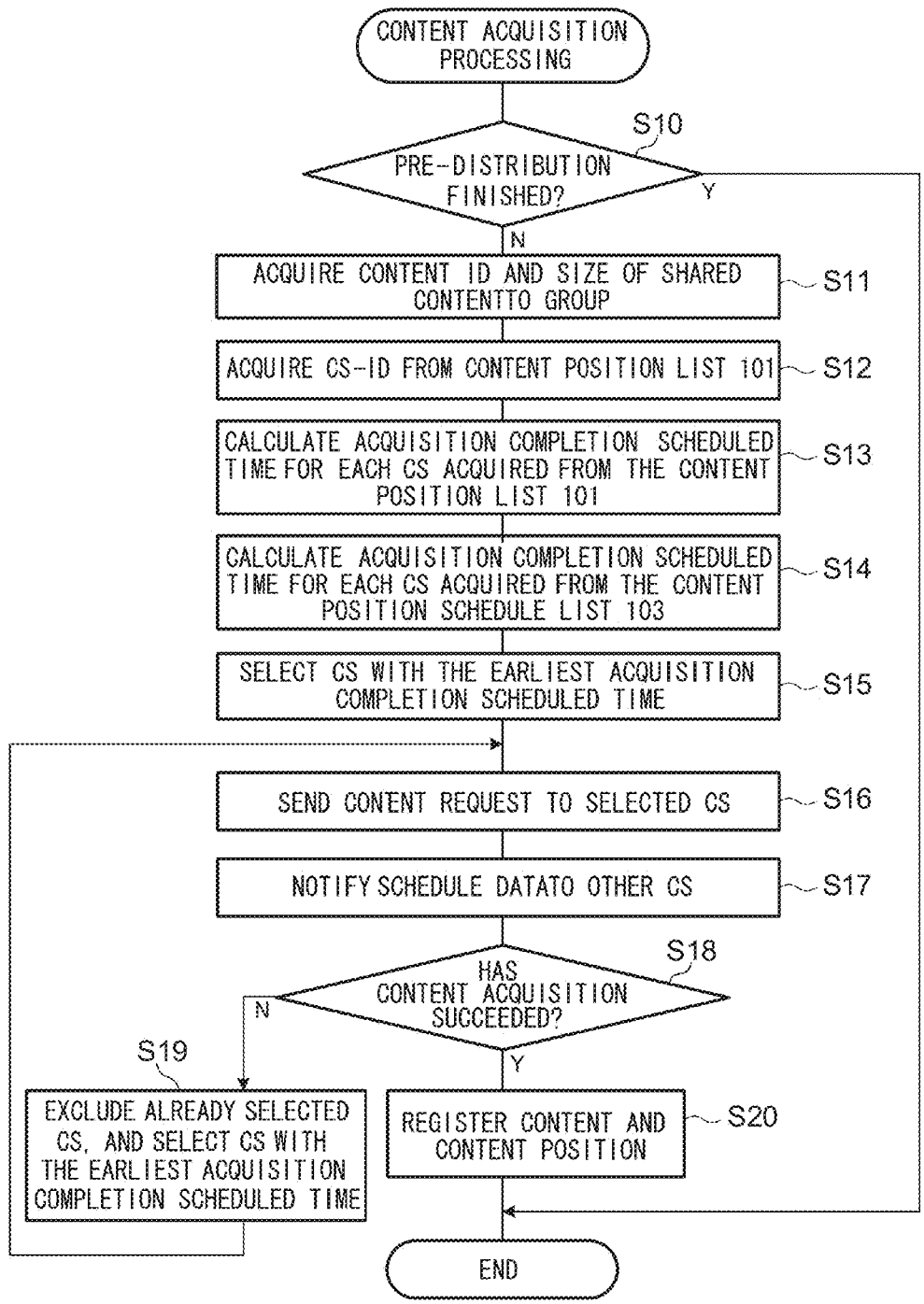
FIG. 15 is a flowchart illustrating an example of content acquisition processing in the first exemplary embodiment.

At step S10 of the content acquisition processing illustrated in FIG. 15, the group data acquisition section 21 receives a message of group registration transmitted from the user terminal 60n, and acquires the group ID included in the message. Based on the group ID acquired by the group data acquisition section 21, the selection section 22 then determines whether or not shared content to the group illustrated by the group ID has been distributed to its own device. More specifically, the selection section 22 references the content list 100 stored in the content list storage section 31, and acquires a content ID of content corresponding to the group ID. The selection section 22 then determines whether or not content corresponding to the acquired content ID is stored on the content storage section 34 of the storage device 30n. When stored, the content acquisition processing is ended since pre-distribution is complete. Processing transitions to step S11 when not stored.

At step S11, the selection section 22 uses the group ID as a key to acquire the content ID, and the size of the content, from the content list 100. The content ID may be employed as it is as the acquired content ID at step S10.

At the next step S12, the selection section 22 uses the acquired content ID as a key, and interrogates the content management device 40 for the position of the content indicated by the content ID. The content management device 40 references the content position list 101 stored in the content position list storage section 44, and transmits to the cache server 20n, as the content position, the CS-IDs of the cache servers distributed with the content. The selection section 22 acquires the CS-ID from the content management device 40.

At the next step S13, the selection section 22 uses the acquired CS-ID as a key, and acquires the throughput corresponding to the CS-ID with each of the cache servers from the speed list 102. Based on the size of the content acquired from the content list 100 and the throughput with each of the cache servers, the selection section 22 calculates the acquisition times needed to acquire the content from each of the cache servers. The selection section 22 then takes the time expressed by the current time+the acquisition time as the acquisition completion scheduled time.

At the next step S14, the selection section 22 references the content position schedule list 103 stored in the schedule data storage section 33, and acquires the CS-ID of the cache servers in the process of acquiring the content desired for acquisition, and the acquisition completion scheduled time for these cache servers. The selection section 22 then calculates the acquisition time were the content to be acquired from the cache servers acquired from the content position schedule list 103. The selection section 22 also takes the time expressed by the acquisition completion scheduled time acquired from the content position schedule list 103+the acquisition time as the acquisition completion scheduled time from these cache servers.

At the next step S15, the selection section 22 selects the cache server with the earliest acquisition completion scheduled time from out of the cache servers acquired from the content position list 101 and the cache servers acquired from the content position schedule list 103.

At the next step S16, the content acquisition section 25 requests distribution of the content by, for example, transmitting the content ID of the desired content to the cache server selected by the selection section 22.

At the next step S17, the schedule data notification section 23 creates schedule data including, for example, the content ID of the content in the process of being acquired, the CS-ID of its own device, and the acquisition completion scheduled time of the content in its own device. The schedule data notification section 23 then notifies the created schedule data by multi-address transmission of the same data to the other cache servers.

At the next step S18, the content acquisition section 25 determines whether or not content acquisition has succeeded. Processing transitions to step S19 when the acquisition of content has failed. At step S19, the selection section 22 excludes the cache server selected at step S15, and selects the cache server with the earliest acquisition completion scheduled time computed at step S13 and step S14, before returning to step S16.

However, when the acquisition of content has succeeded, processing transitions to step S20. At step S20, the content acquisition section 25 stores the acquired content in the content storage section 34. The content acquisition section 25 also transmits data including, for example, the content ID of the content that has completed acquisition, and the CS-ID of its own device, to the content management device 40, and then ends the content acquisition processing.

Figure 16:
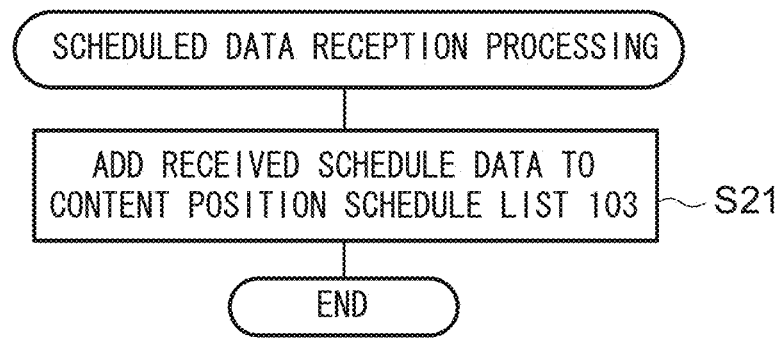
FIG. 16 is a flowchart illustrating an example of scheduled data reception processing in the first exemplary embodiment.

Then, at step S21 of the scheduled data reception processing illustrated in FIG. 16, the scheduled data reception section 24 adds the received schedule data as an entry to the content position schedule list 103 stored in the schedule data storage section 33, and then ends the scheduled data reception processing.

Figure 17:
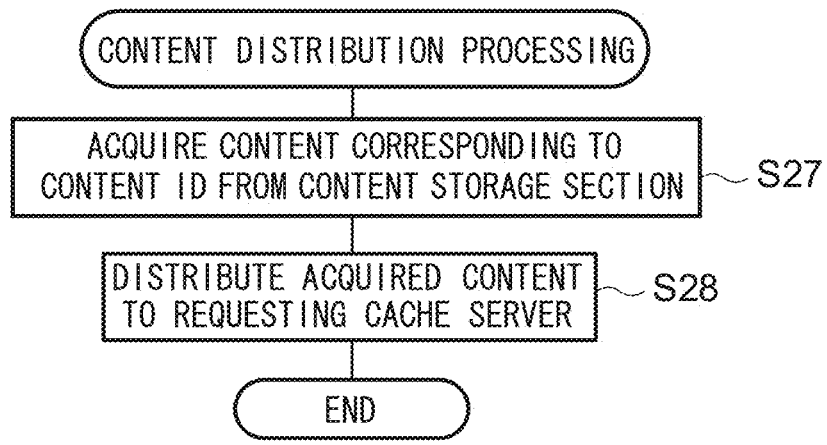
FIG. 17 is a flowchart illustrating an example of content distribution processing.

Then, at step S27 of the content distribution processing illustrated in FIG. 17, the content request response section 26 acquires the content corresponding to the received content ID from the content storage section 34. Then at step S28, the content request response section 26 transmits the acquired content to the requesting cache server as a response to the content request, and then ends the content distribution processing.

As explained above, in the content acquisition system 10 according to the first exemplary embodiment, the cache server 20n receives data of content in the process of being acquired from the other cache servers. The cache server capable of acquiring the content the earliest from out of the cache servers holding the content, or in the process of acquiring the content, is selected, and the content is acquired. This thereby enables the period of time needed to acquire the content to be shortened.

Second Exemplary Embodiment

Explanation next follows regarding a second exemplary embodiment. Explanation will be omitted of portions similar to those of the content acquisition system 10 according to the first exemplary embodiment.

Figure 18:
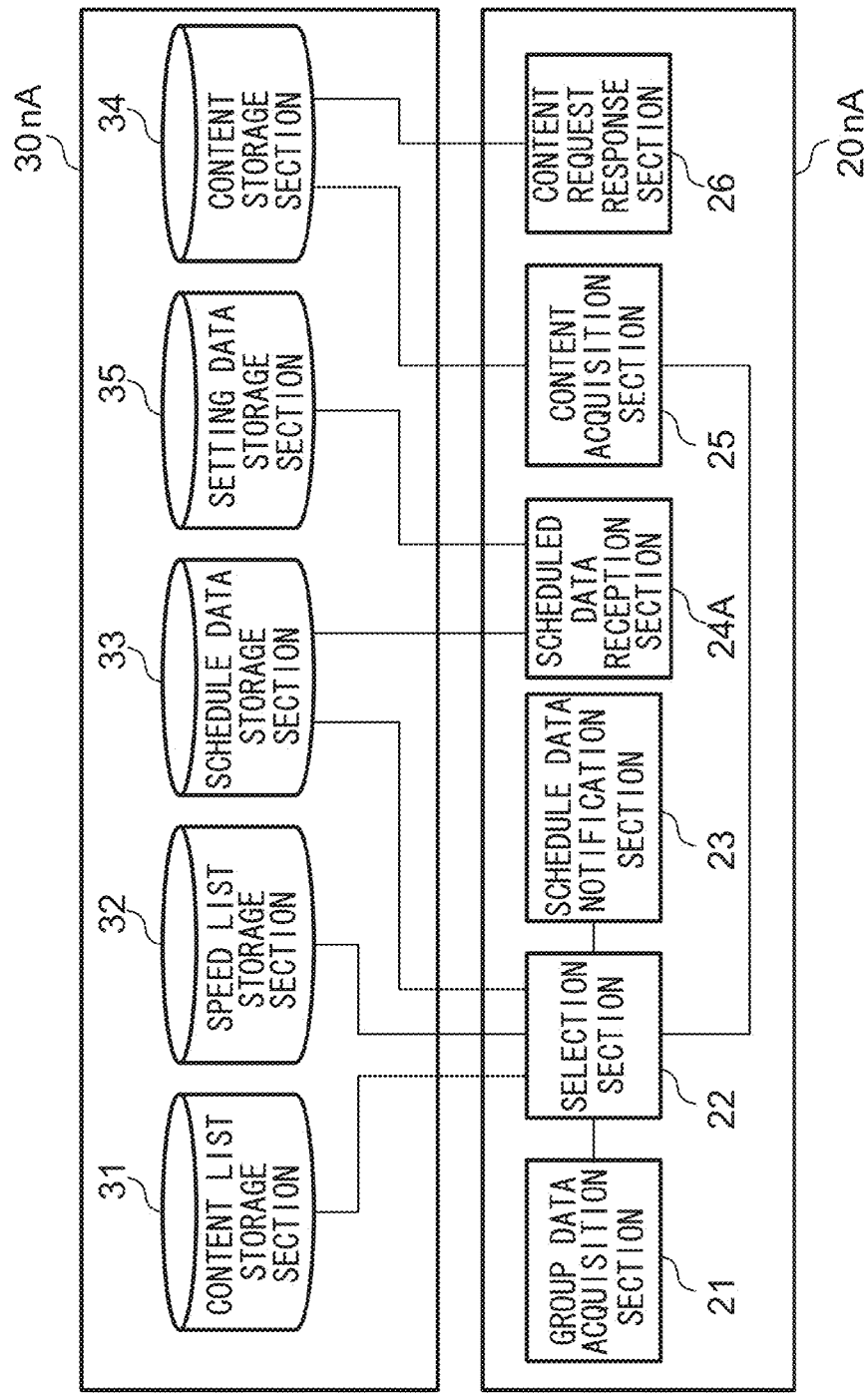
FIG. 18 is a block diagram illustrating a schematic configuration of a cache server according to a second exemplary embodiment.

FIG. 18 illustrates a cache server 20nA and a storage device 30nA according to the second exemplary embodiment. Portions similar to those of the cache server 20n and the storage device 30n according to the first exemplary embodiment are allocated the same reference numerals, and detailed explanation will be omitted thereof.

As illustrated in FIG. 18, the storage device 30nA includes a content list storage section 31, a speed list storage section 32, a schedule data storage section 33, a content storage section 34, and a setting data storage section 35.

Figure 19:
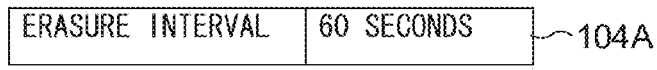
FIG. 19 is a diagram illustrating an example of a setting data table of the second exemplary embodiment.

Setting data related to content acquisition processing executed in the cache server 20nA is stored in the setting data storage section 35. In the second exemplary embodiment, a setting data table 104A including an erasure interval setting is stored, for example as illustrated in FIG. 19. The erasure interval is for determining the interval to execute processing to erase an entry indicating schedule data with an acquisition completion scheduled time older than the current time from the schedule data recorded in the content position schedule list 103 stored in the schedule data storage section 33.

The cache server 20nA includes a group data acquisition section 21, a selection section 22, a schedule data notification section 23, a scheduled data reception section 24A, a content acquisition section 25, and a content request response section 26.

Similarly to the scheduled data reception section 24 according to the first exemplary embodiment, the scheduled data reception section 24A receives the schedule data notified by the other cache servers, and adds the received schedule data as an entry to the content position schedule list 103 stored in the schedule data storage section 33.

The scheduled data reception section 24A according to the second exemplary embodiment also, every time the erasure interval elapses, erases entries indicating scheduled data with acquisition completion scheduled times older than the current time from the schedule data recorded in the content position schedule list 103 stored in the schedule data storage section 33. When the acquisition of content is complete, the cache server 20nA records, in the content position list 101 of the content management device 40, that the content has been distributed to its own device. The schedule data recorded in the content position schedule list 103 is not needed after recording in the content position list 101 has been completed. Thus the memory capacity needed for the content position schedule list 103 can be reduced by erasing the old entries of schedule data recorded in the content position schedule list 103 at the set erasure interval.

For example, say the scheduled data reception section 24A of the cache server 20B has added an entry of schedule data <abc, CS205, 11:20:20> to the content position schedule list 103 at 11:20:11. As illustrated in FIG. 19, when 60 seconds is set as the erasure interval, the scheduled data reception section 24A of the cache server 20B erases the entry of schedule data <abc, CS205, 11:20:20> 60 seconds later, at 11:21:11.

Explanation next follows regarding operation of the content acquisition system 10 according to the second exemplary embodiment, focusing on points differing from the first exemplary embodiment. The cache server 20$n$A executes the scheduled data reception processing illustrated in FIG. 20 when schedule data has been received from another cache server. The cache server 20$n$A executes the schedule data erasure processing illustrated in FIG. 21. Processing similar to that of the first exemplary embodiment is allocated the same reference numerals, and detailed explanation will be omitted thereof.

Figure 20:
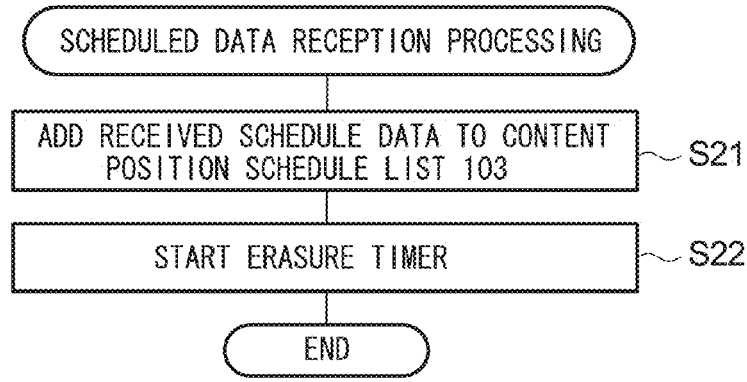
FIG. 20 is a flowchart illustrating an example of scheduled data reception processing of the second exemplary embodiment.

At step S21 of the scheduled data reception processing illustrated in FIG. 20, the scheduled data reception section 24A adds an entry indicating the received schedule data to the content position schedule list 103. Then at step S22, the scheduled data reception section 24A starts an erasure timer to time the erasure interval recorded in the setting data table 104A, and ends the scheduled data reception processing.

Figure 21:
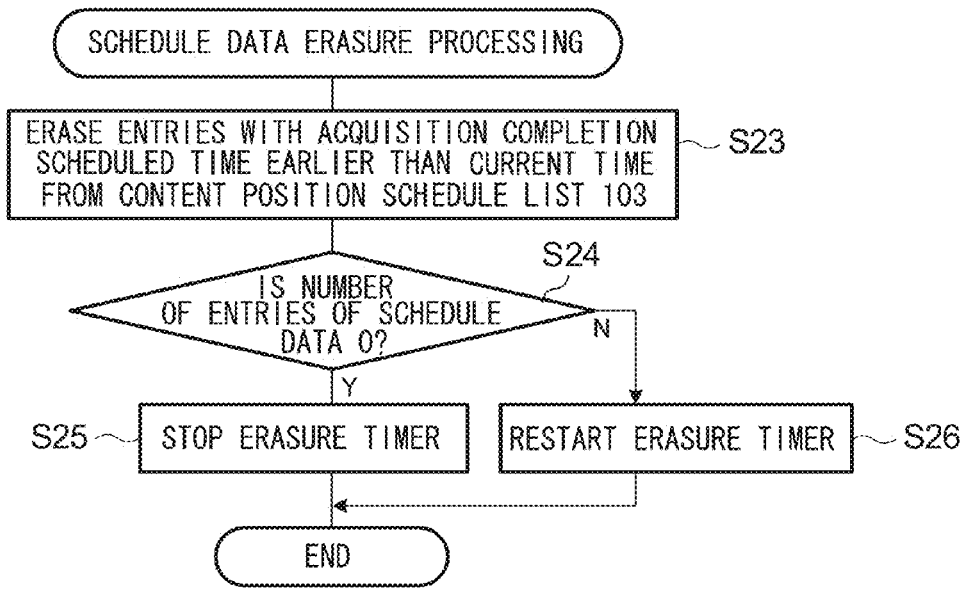
FIG. 21 is a flowchart illustrating an example of scheduled data reception processing.

When the timing of the erasure timer has reached the set erasure interval, the schedule data erasure processing illustrated in FIG. 21 is executed. First, at step S23, the scheduled data reception section 24A erases any entries of schedule data with acquisition completion scheduled times older than the current time from the schedule data recorded in the content position schedule list 103.

Then at step S24, the scheduled data reception section 24A determines whether or not the number of entries of the schedule data recorded in the content position schedule list 103 is zero. Processing transitions to step S25 when the number of entries is zero, and the scheduled data reception section 24A stops the erasure timer, and ends the schedule data erasure processing.

However, the scheduled data reception section 24A restarts the erasure timer when the number of entries recorded in the content position schedule list 103 is not zero, and ends the schedule data erasure processing.

As explained above, in the content acquisition system 10 according to the second exemplary embodiment, the cache server 20$n$A erases old schedule data recorded in the content position schedule list 103 every time the erasure interval elapses. This thereby enables the memory capacity needed for the content position schedule list 103 to be reduced.

Configuration may be made such that verification is made that the same contents as the schedule data recorded in the content position schedule list 103 is recorded in the content position list 101, and then the schedule data recorded in the content position list 101 erased from the content position schedule list 103. The verification of recording in the content position list 101 may be by verification by interrogating the content management device 40 and the other cache servers, or may be by verification of a notification from the content management device 40 and the other cache server. However, there is no communication between the content management device 40 and the other cache servers when the old schedule data recorded in the content position schedule list 103 is erased in cases in which an erasure interval is set, as in the second exemplary embodiment, enabling the load on the network to be reduced.

Third Exemplary Embodiment

Explanation next follows regarding a third exemplary embodiment. Note that explanation is omitted for portions similar to those of the content acquisition system 10 according to the first exemplary embodiment.

Figure 22:
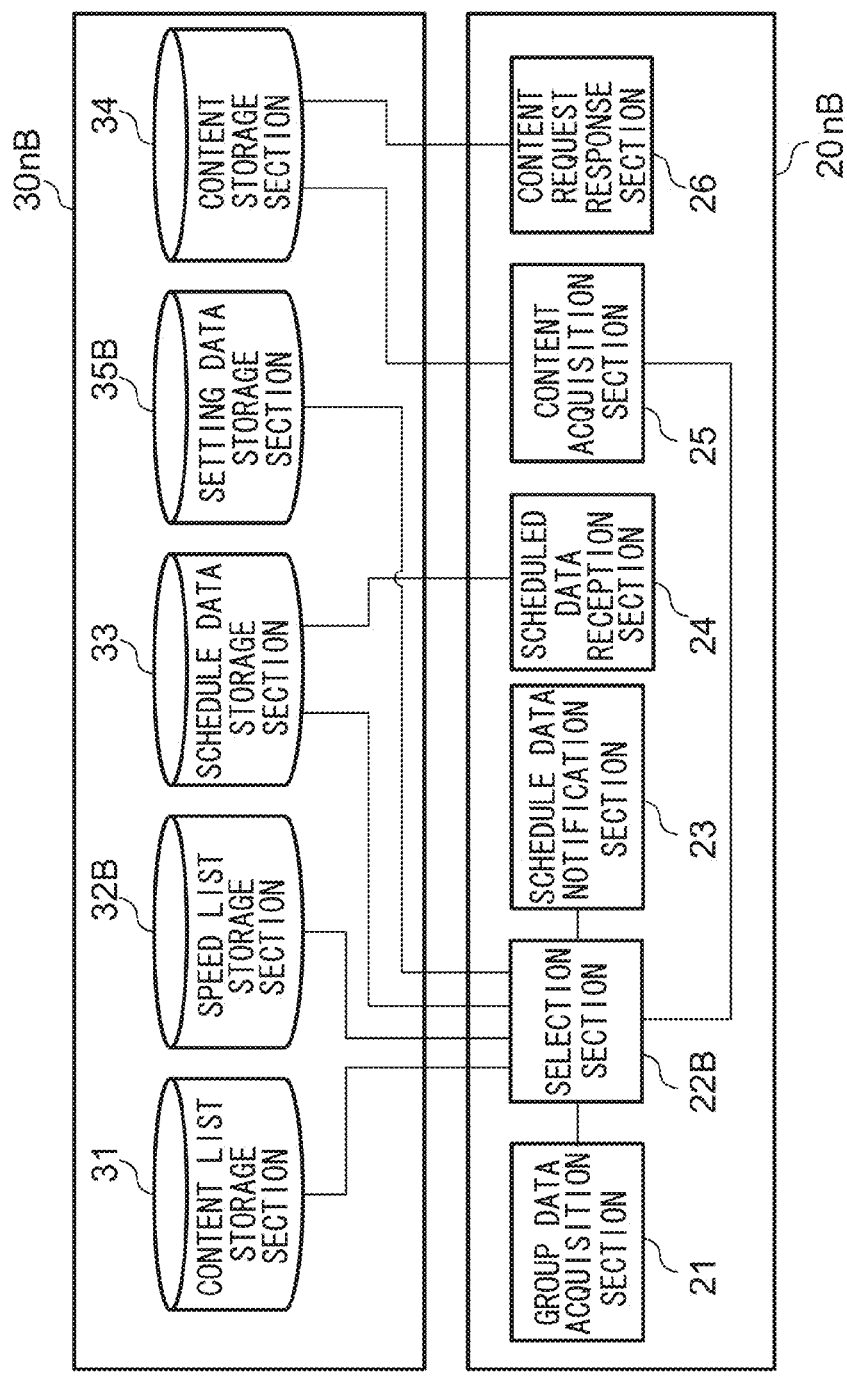
FIG. 22 is a block diagram illustrating a schematic configuration of a cache server according to a third exemplary embodiment.

FIG. 22 illustrates a cache server 20$n$B and a storage device 30$n$B according to a third exemplary embodiment. Portions similar to those of the cache server 20$n$ and the storage device 30$n$ according to the first exemplary embodiment are allocated the same reference numerals, and detailed explanation will be omitted thereof.

As illustrated in FIG. 22, the storage device 30$n$B includes a content list storage section 31, a speed list storage section 32B, a schedule data storage section 33, a content storage section 34, and a setting data storage section 35B.

Setting data relating to content acquisition processing executed in the cache server 20$n$B is stored in the setting data storage section 35B. In the third exemplary embodiment, a setting data table 104B including data of a maximum time for pre-distribution, such as for example that illustrated in FIG. 23, is stored. The maximum time for pre-distribution is the anticipated time from starting terminal app on a user terminal 60$n$ until a content is requested, determined as the upper limit time for pre-distribution of content in the nearby cache server.

A speed list indicating the communication state between the corresponding cache server 20$n$B and each of the other cache servers is stored in the speed list storage section 32B. FIG. 24 illustrates an example of a speed list 102B stored in the speed list storage section 32B of the cache server 20B. In the example of FIG. 24, similarly to in the speed list 102 according to the first exemplary embodiment, the CS-ID of the other cache servers and the throughput with the other cache servers (Mbps) are associated with each other. Moreover, in the speed list 102B, a hop number indicating the number of relay devices between the device itself and the other cache servers is also associated therein.

The cache server 20$n$B includes a group data acquisition section 21, a selection section 22B, a schedule data notification section 23, a scheduled data reception section 24, a content acquisition section 25, and a content request response section 26.

Similarly to in the selection section 22 according to the first exemplary embodiment, the selection section 22B calculates the acquisition completion scheduled time of content in each of the cache servers holding, or in the process of acquiring, the shared content of the group, acquired from the content position list 101 and the content position schedule list 103.

In the first exemplary embodiment the cache server having the earliest acquisition completion scheduled time is selected, however it is sufficient for the pre-distribution of content to the nearby cache server to be completed before a content request from the user terminal 60$n$. Thus in the selection section 22B according to the third exemplary embodiment, first cache servers are extracted whose times from receipt of the group ID by the group data acquisition section 21 till the acquisition completion scheduled time fall within the maximum time for pre-distribution set in the setting data table 104B. Then, as long as there is an extracted cache server, the selection section 22B selects from out of the extracted cache servers a cache server from which to acquire the content, since the objective of pre-distribution of content to the nearby cache server can be achieved.

For example, as in the example of the first exemplary embodiment, in the cache server 20 6, the acquisition completion scheduled time from the cache server 20 1 is calculated as 11:20:40, and the acquisition completion scheduled time from the cache server 20 4 is calculated as 11:20:25. Moreover, say the acquisition completion scheduled time from the cache server 20 5 is 11:20:22. Say the reception of the group ID is 11:20:15, and the maximum time for pre-distribution is 15 seconds, as illustrated in FIG. 23. In such a case, the cache servers 20 4, 20 5 are extracted since the time from receiving the group ID till the acquisition completion scheduled time is 25 seconds in the cache server 20 1, is 10 seconds in the cache server 20 4, and is 7 seconds in the cache server 20 5.

Moreover, the selection section 22B references the speed list 102B stored in the speed list storage section 32B and selects the cache server with the minimum hop number to its own device from the extracted cache servers. When there are a large number of hops, the communication cost is higher due to there being that many more relay devices passed through. Thus the cache server with the minimum number of hops is selected in order to prevent the communication cost from being higher, while still achieving the objective of pre-distribution of the content to the nearby cache server. For example, the selection section 22B of the cache server 20 6 references the number of hops in the speed list 102B illustrated in FIG. 24, and selects the cache server 20 5 from out of the extracted cache servers 20 4, 20 5.

In cases in which there is no cache server present within the maximum time for pre-distribution, the selection section 22B, similarly to in the first exemplary embodiment, selects the cache server with the earliest acquisition completion scheduled time.

Explanation next follows regarding operation of the content acquisition system 10 according to the third exemplary embodiment, focusing on points differing from the first exemplary embodiment. When group registration is performed from the user terminal 60$n$, the nearby cache server 20$n$B to the user terminal 60$n$ executes the content acquisition processing illustrated in FIG. 25. Processing similar to that of the first exemplary embodiment is allocated the same reference numerals, and detailed explanation will be omitted thereof.

Figure 25:
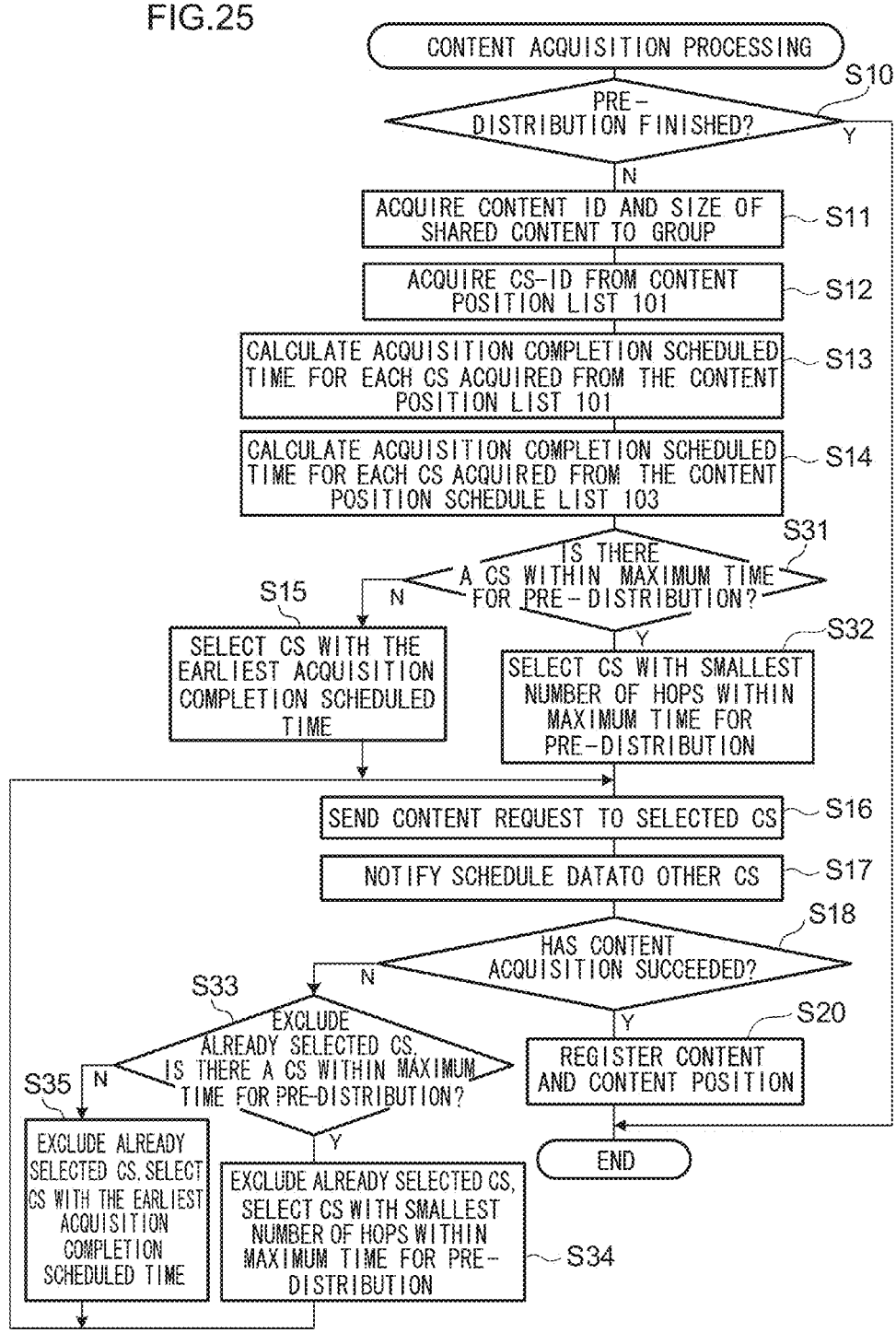
FIG. 25 is a flowchart illustrating an example of content acquisition processing of the third exemplary embodiment.

At steps S10 to S14 of the content acquisition program illustrated in FIG. 25, the selection section 22B acquires data of each of the cache servers holding, or in the process of acquiring, the shared content of the group, from the content position list 101 and the content position schedule list 103. The selection section 22B then calculates the acquisition completion scheduled time of the content for each of the cache servers holding, or in the process of acquiring, the content.

Then at step S31, the selection section 22B determines whether or not there are any cache servers for whom the time from receiving the group ID with the group data acquisition section 21 to the acquisition completion scheduled time is within the maximum time for pre-distribution set in the setting data table 104B. Processing transitions to step S32 when a cache server within the maximum time for pre-distribution is present, and processing transitions to step S15 when none are present.

At step S32, the selection section 22B references the speed list 102B stored in the speed list storage section 32B, and selects the cache server having the minimum number of hops to its own device from out of the cache servers within the maximum time for pre-distribution, and then processing transitions to step S16. At step S15, the selection section 22B, selects the cache server having the earliest acquisition completion scheduled time calculated at step S13 and step S14, and processing transitions to step S16.

Processing similar to that of the first exemplary embodiment is executed at steps S16 to S18, and processing transitions to step S33 when negative determination is made at step S18. At step S33, the selection section 22B excludes the cache server selected at step S15 or S32, and determines whether or not there is a cache server present within the maximum time for pre-distribution. Processing transitions to step S34 when there is a cache server present within the maximum time for pre-distribution, and processing transitions to step S35 when there is no such cache server present.

At step S34, the selection section 22B excludes the cache server selected at steps S15 or S32, and selects the cache server with the minimum number of hops to its own device from out of the cache servers within the maximum time for pre-distribution, then processing returns to step S16. At step S35, the selection section 22B excludes the cache server selected at steps S15 or S32, selects the cache server with the earliest acquisition completion scheduled time calculated at steps S13 and S14, and then processing returns to step S16.

If affirmative determination is made at step S18, then the content acquisition program is ended via step S20, As explained above, in the content acquisition system 10 according to the third exemplary embodiment, the cache server 20$n$B extracts the cache servers having a time from receipt of the group ID to acquisition completion scheduled time that is within the set maximum time for pre-distribution. The cache server having the minimum number of hops to the device itself is then selected from the extracted cache servers. This thereby enables the communication cost to be prevented from getting higher while still achieving the objective of pre-distribution of content to the nearby cache server.

Similarly to in the second exemplary embodiment, an erasure interval may be set in the third exemplary embodiment, and the old schedule data is erased from the content position schedule list 103.

Fourth Exemplary Embodiment

Explanation follows regarding a fourth exemplary embodiment. Portions similar to the content acquisition system 10 according to the first exemplary embodiment are allocated the same reference numerals, and detailed explanation will be omitted thereof.

Figure 26:
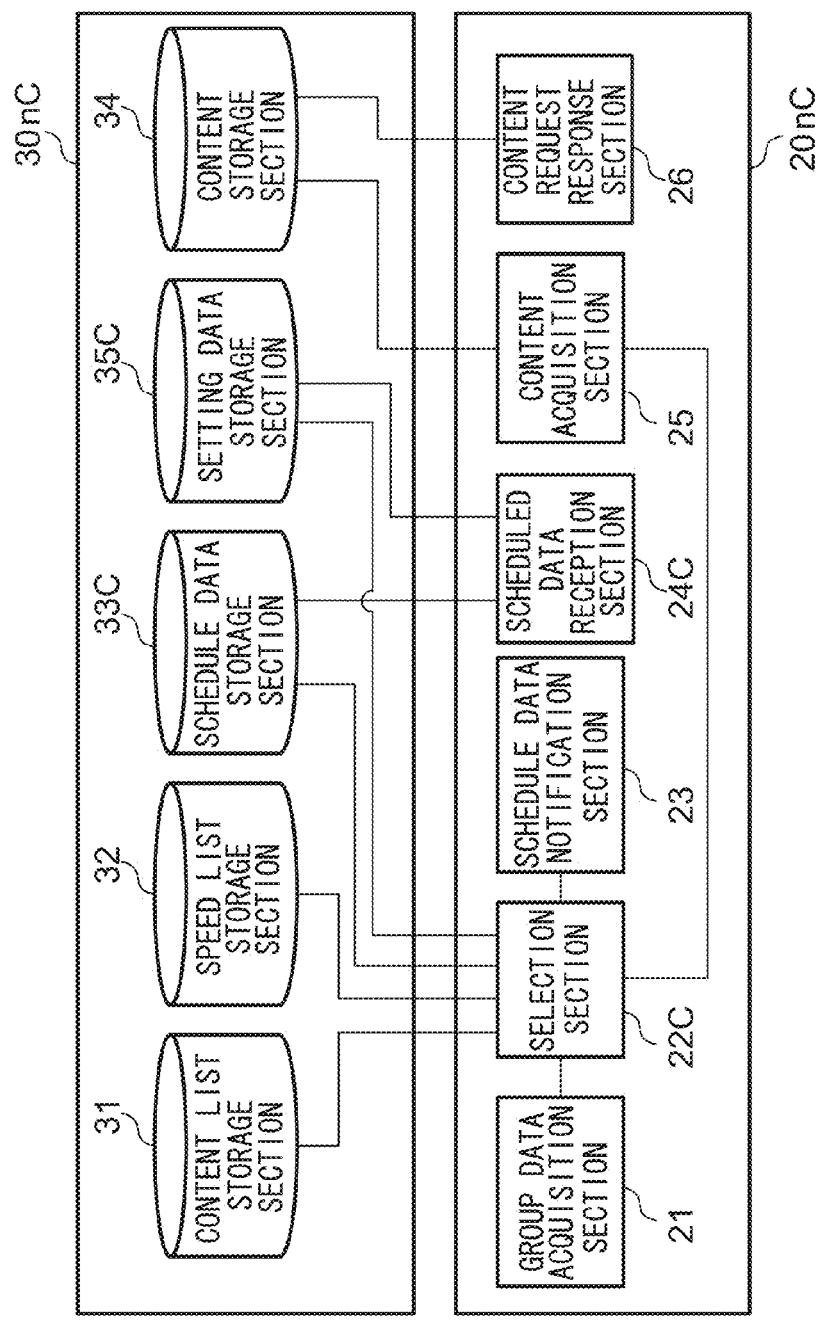
FIG. 26 is a block diagram illustrating a schematic configuration of a cache server according to a fourth exemplary embodiment.

FIG. 26 illustrates a cache server 20$n$C and a storage device 30$n$C according to the fourth exemplary embodiment. Portions similar to the cache server 20$n$ and the storage device 30$n$ according to the first exemplary embodiment are allocated the same reference numerals, and detailed explanation will be omitted thereof.

As illustrated in FIG. 26, the storage device 30$n$C includes a content list storage section 31, a speed list storage section 32, a schedule data storage section 33C, a content storage section 34, and a setting data storage section 35C.

Setting data relating to content acquisition processing executed in the cache server 20$n$C is stored in the setting data storage section 35C. In the fourth exemplary embodiment, a setting data table 104C is stored, such as for example that illustrated in FIG. 27, including data of a count duration and a number of notifications upper limit. The count duration is determined as a duration to count the number of schedule data notified from other cache servers. The notification number upper limit is determined as an upper limit value to determine whether or not the schedule data notified from the same cache server within a count duration has exceeded a specific number.

Similarly to in the schedule data storage section 33 according to the first exemplary embodiment, a content position schedule list 103 is stored in the schedule data storage section 33C. Moreover, a schedule data count list that stores a count duration worth of data for counting the number of schedule data notified from the other cache servers is stored in the schedule data storage section 33C. FIG. 28 illustrates an example of a schedule data count list 105. In the example of FIG. 28, CS-IDs of cache servers notifying schedule data, and the reception time the schedule data was received are associated with each other. Namely, the entry <CS205, 11:20:10> of the schedule data count list 105 illustrated in FIG. 28 means that "schedule data was received at 11:20:10 from the cache server 205 of the CS-ID=CS205".

The cache server 20nC includes a group data acquisition section 21, a selection section 22C, a schedule data notification section 23, a scheduled data reception section 24C, a content acquisition section 25, and a content request response section 26.

Similarly to the scheduled data reception section 24 according to the first exemplary embodiment, the scheduled data reception section 24C receives schedule data notified from the other cache servers, and adds the received schedule data as an entry to the content position schedule list 103 stored in the schedule data storage section 33C.

The scheduled data reception section 24C according to the fourth exemplary embodiment adds an entry of the CS-ID of the notifying cache server for the received schedule data, and the reception time when the schedule data was received, as an associated entry in the schedule data count list 105 stored in the schedule data storage section 33C. The scheduled data reception section 24C also excludes from the schedule data count list 105 any entry having a time from the receipt time to the current time that exceeds the count duration set in the setting data table 104C.

Similarly to in the selection section 22 according to the first exemplary embodiment, the selection section 22C calculates the acquisition completion scheduled time of the content in each of the cache servers holding, or in the process of acquiring, the shared content of the group, acquired from the content position list 101 and the content position schedule list 103.

In the first exemplary embodiment, the cache server with the earliest acquisition completion scheduled time is selected, however the processing load is increased for cache servers that frequently acquire content, namely the cache servers that frequently perform schedule data notification. Thus, even when the speed list 102 is updated each specific period of time, sometimes updating is not able to keep up and the actual throughput falls below the throughput recorded in the speed list 102.

Thus in the selection section 22C according to the fourth exemplary embodiment, first the cache servers are extracted whose number of received schedule data within the count duration falls within a notification number upper limit Any cache servers having a notification number of schedule data within the count duration exceeding the notification number upper limit is determined to have an increasing processing load, and is excluded from the cache servers for acquisition of content. For example, FIG. 28 illustrates an example of the schedule data count list 105 in which the number of entries for the CS-ID=CS204 is four. Thus, as illustrated in FIG. 27, if the notification number upper limit is three, then the cache server 204 of the CS-ID=CS204 is excluded. The selection section 22C then selects the cache server having the earliest acquisition completion scheduled time from the extracted cache servers.

The selection section 22C also selects the cache server having the earliest acquisition completion scheduled time included in the cache servers exceeding the notification number upper limit when there is no cache server present having a number of notifications of schedule data during the count duration within the notification number upper limit.

Explanation follows regarding operation of the content acquisition system 10 according to the fourth exemplary embodiment, focusing on points differing from the first exemplary embodiment. On receipt of schedule data from another cache server, the cache server 20nC executes the scheduled data reception processing illustrated in FIG. 29. On group registration from the user terminal 60n, the nearby cache server 20nC to the user terminal 60n executes the content acquisition processing illustrated in FIG. 30. Processing similar to that of the first exemplary embodiment is allocated the same reference numerals, and detailed explanation will be omitted thereof.

Figure 29:
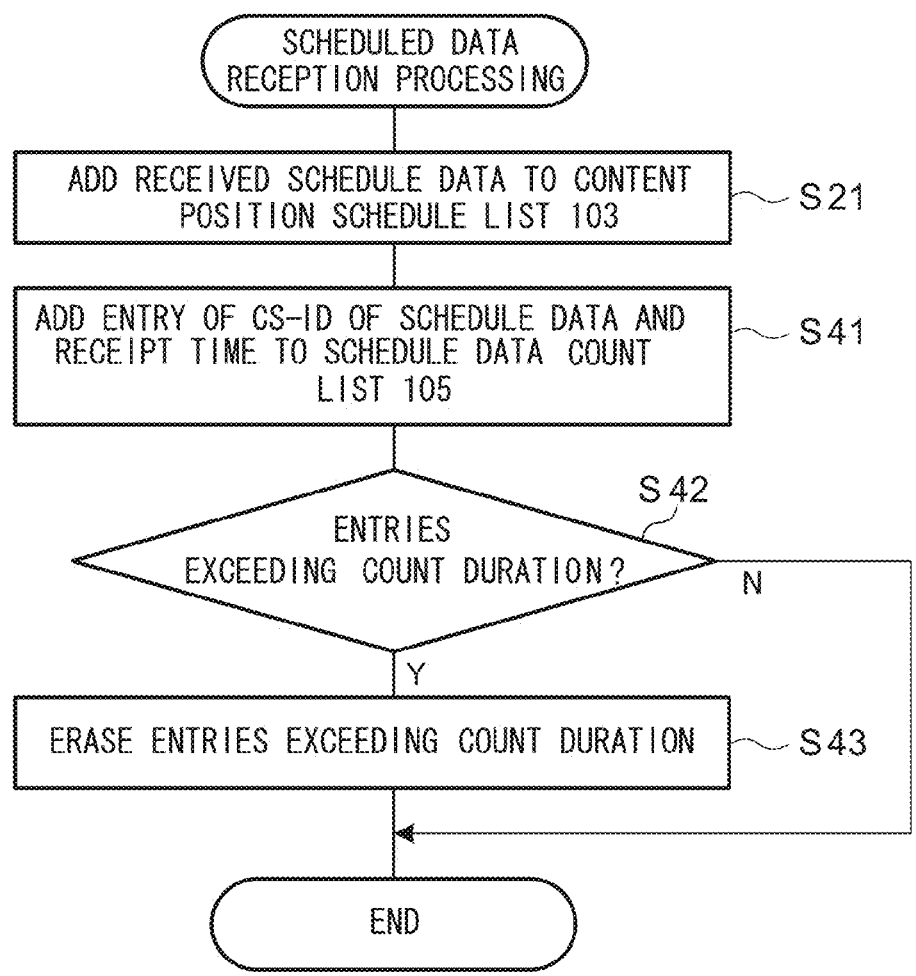
FIG. 29 is a flowchart illustrating an example of scheduled data reception processing in the fourth exemplary embodiment.

At step S21 in the scheduled data reception processing illustrated in FIG. 29, the scheduled data reception section 24C adds an entry indicating the received schedule data to the content position schedule list 103. At the next step S41, the scheduled data reception section 24C adds an entry to the schedule data count list 105 stored in the schedule data storage section 33C, with a CS-ID of the cache server notifying the received schedule data and the reception time when the schedule data was received associated with each other.

At the next step S42, the scheduled data reception section 24C determines whether or not there are entries present in the time from the reception time to the current time exceeding the count duration set in the setting data table 104C. Processing transitions to step S43 when present, and the scheduled data reception section 24C erases entries exceeding the count duration from the schedule data count list 105, and the schedule data reception processing is ended. However, when there are no entries present that exceed the count duration, step S43 is skipped, and the scheduled data reception processing is ended.

Figure 30:
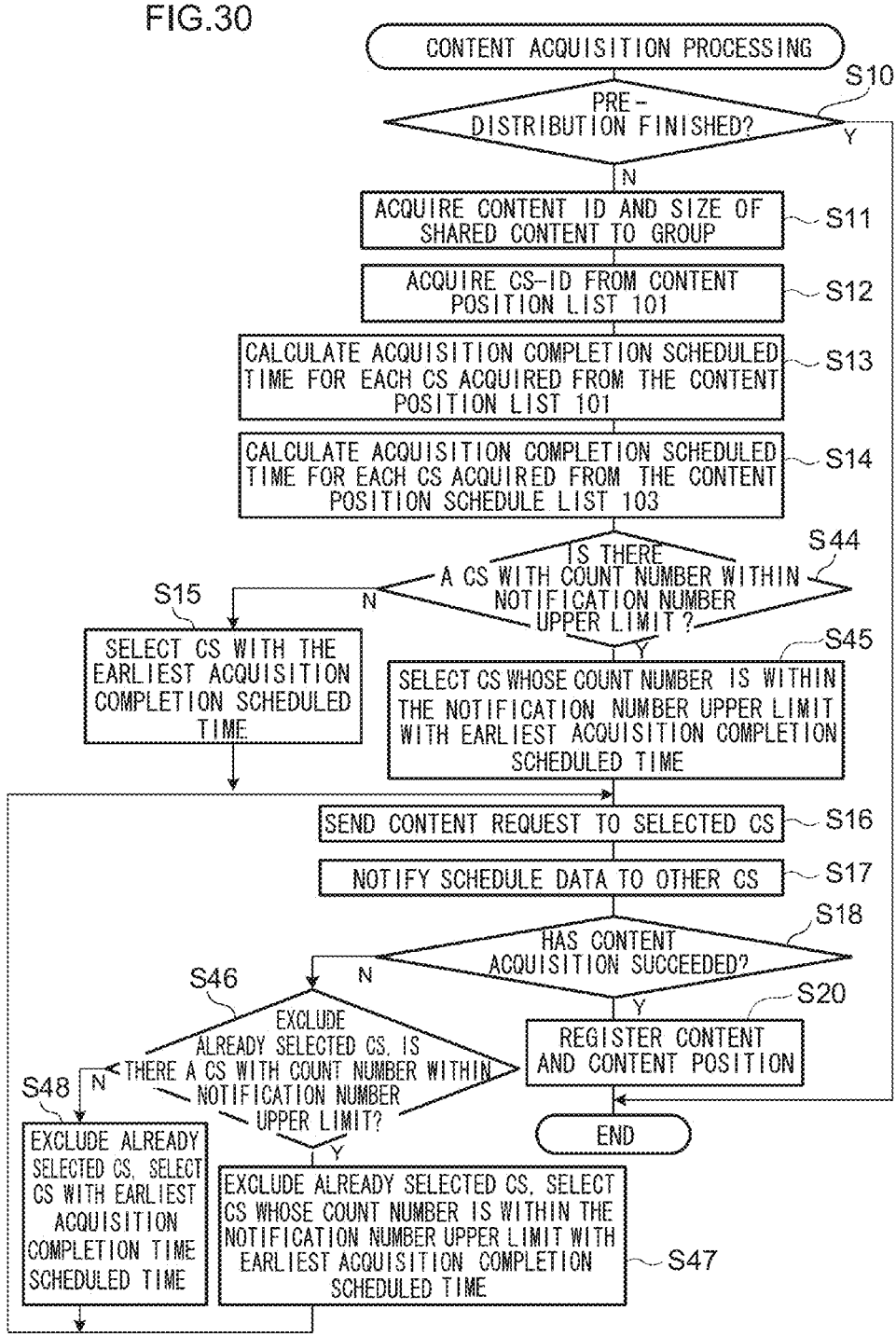
FIG. 30 is a flowchart illustrating an example of content acquisition processing in the fourth exemplary embodiment.

Then, at step S10 to S14 of the content acquisition processing illustrated in FIG. 30, the selection section 22C acquires from the content position list 101 and the content position schedule list 103 data for each of the cache servers holding, or in the process of acquiring, the shared content of the group. The selection section 22C then calculates the content acquisition completion scheduled time for each of the cache servers holding, or in the process of acquiring, the content.

At the next step S44, the selection section 22C counts the numbers of entries for each of the CS-ID in the schedule data count list 105 stored in the schedule data storage section 33C. Based on the counted number of entries, the selection section 22C then determines whether or not there are cache servers present with a received number of schedule data within a notification number upper limit in the count duration. Processing transitions to step S45 when there is a cache server present within the notification number upper limit, and processing transitions to step S15 when not present.

At step S45, the selection section 22C selects the cache server with the earliest acquisition completion scheduled time calculated at steps S13 and S14 from the cache servers within the notification number upper limit, and then processing transitions to step S16. At step S15, the selection section 22C selects the cache server with the earliest acquisition completion scheduled time calculated at steps S13 and S14 and then processing transitions to step S16.

Similar processing to that of the first exemplary embodiment is executed at step S16 to S18. Processing transitions to step S46 when negative determination is made at step S18. At step S46, the selection section 22C excludes the cache server selected at steps S15 or S45, and determines whether or not there are cache servers present within the notification number upper limit Processing proceeds to step S47 when there is a cache server present within the notification number upper limit, and processing proceeds to step S48 when there is no such cache server present.

At step S47, the selection section 22C excludes the cache server selected at steps S15 or S45, and selects the cache server with the earliest acquisition completion scheduled time calculated at steps S13 and S14 from out of the cache servers within the notification number upper limit Processing then returns to step S16. At step S48, the selection section 22C excludes the cache server selected at steps S15 or S45, and selects the cache server with the earliest acquisition completion scheduled time calculated at steps S13 and S14 and then processing returns to step S16.

When affirmative determination is made at step S18, the content acquisition processing is ended via step S20.

As explained above, in the content acquisition system 10 according to the fourth exemplary embodiment, the cache server 20nC selects the cache server with the earliest acquisition completion scheduled time from out of the cache servers whose number of notifications of schedule data within the count duration is within the notification number upper limit. This thereby enables the cache server to be selected for acquiring the content from, while excluding the cache servers with increasing processing load.

Similarly to in the second exemplary embodiment, in the fourth exemplary embodiment an erasure interval may be set such that the old schedule data is erased from the content position schedule list 103. Moreover, similarly to in the third exemplary embodiment, the cache server with the minimum number of hops may be selected from the cache servers within the maximum time for pre-distribution.

Fifth Exemplary Embodiment

Explanation next follows regarding a fifth exemplary embodiment. Explanation will be omitted for portions similar to the content acquisition system 10 according to the first exemplary embodiment.

As illustrated in FIG. 5, a cache server 20nD includes a group data acquisition section 21, a selection section 22, a schedule data notification section 23D, a scheduled data reception section 24, a content acquisition section 25, and a content request response section 26.

The schedule data notification section 23D, similarly to the schedule data notification section 23 according to the first exemplary embodiment, generates schedule data that is data of acquisition completion scheduled times of content, and notifies by multi-address transmission of this data to other cache servers. When doing so, the schedule data notification section 23D according to the fifth exemplary embodiment notifies the schedule data to cache servers with higher throughputs than the cache server selected as the cache server to acquire the content. Cache servers with small throughput have a low probability of their own device being selected when another cache servers are selecting to acquire content in that cache server. For a cache server with small throughput there is accordingly a high possibility that any schedule data notified by the device itself will be wasted. Thus sometimes the load on the network is reduced by limiting the cache servers to notify the schedule data to.

Explanation follows regarding operation of the content acquisition system 10 according to the fifth exemplary embodiment. In the fifth exemplary embodiment, step S51 as illustrated in FIG. 31 is executed in place of step S17 of the content acquisition processing according to the first exemplary embodiment (FIG. 15).

At step S51 of the content acquisition program illustrated in FIG. 31, the schedule data notification section 23D creates schedule data that is data of content acquisition completion scheduled times. The schedule data notification section 23D references the speed list 102 stored in the speed list storage section 32, and extracts a cache server with larger throughput than the cache server selected at step S16. The schedule data notification section 23D then notifies the generated schedule data to the extracted cache server.

As explained above, in the content acquisition system 10 according to the fifth exemplary embodiment, the cache server 20nD limits the cache servers to notify with the schedule data. This thereby enables the network load to be reduced.

Explanation has been given in the fifth exemplary embodiment of a case in which a cache server is selected with larger throughput than the cache server selected as the cache server for acquisition of content, however there is no limitation thereto. A cache server having a smaller number of hops than the selected cache server may be selected.

Similarly to in the second exemplary embodiment, in the fifth exemplary embodiment an erasure interval may be set such that the old schedule data is erased from the content position schedule list 103. Moreover, similarly to in the third exemplary embodiment, the cache server with the minimum number of hops may be selected from the cache servers within the maximum time for pre-distribution. Moreover, similarly to in the fourth exemplary embodiment, the cache server with the earliest acquisition completion scheduled time may be selected from the cache servers within the notification number upper limit.

Explanation has been given in each of the exemplary embodiments of cases in which the trigger for pre-distribution of content to a cache server is group registration (subscribe) from a user terminal, however there is no limitation thereto. Connection from a user terminal prior to requesting content, such as login by a user, connection of the user terminal to an access point corresponding to the cache server, may be employed as the trigger.

Explanation has been given in each of the above exemplary embodiment of cases in which the cache server for acquiring contents is selected based on various data stored in the storage device 30n, however there is no limitation thereto. The necessary data for selecting the cache server may be acquired, such as by interrogating the content management device 40 or another cache server.

Explanation has been given in each of the above exemplary embodiment of cases in which the content position list 101 is stored in the content management device 40, however there is no limitation thereto. A content position list management device for managing the content position list 101 may be provided separately to the content management device 40.

Explanation has been given above of a situation in which the content acquisition program 90 is pre-stored (pre-installed) on the storage section 86, however the content acquisition program 90 may be distributed in a format recorded on a recording medium, such as a CD-ROM or DVD-ROM.

An aspect is the advantageous effect of enabling the period of time needed to acquired content to be shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the technology disclosed herein have been described in detail, it should be understood that the various changes, substitutions, and alterations could be made hereto without departing from the spirit and scope of the invention.

What is claimed is:

1. A non-transitory recording medium storing a content acquisition program that causes a computer to execute a process, the process comprising:
    acquiring group data to identify a group that a user belongs to;
    based on a period of time needed to acquire content from each of a first data processing device that holds content shared by the group indicated by the group data, and a second data processing device that is in the process of acquiring the content from the first data processing device, selecting a data processing device from which to acquire the content, from the first data processing device and the second data processing device; and
    acquiring the content from the selected data processing device.

2. The non-transitory recording medium of claim 1, the process further comprising:
    receiving, from the second data processing device, schedule data, including data of content in the process of being acquired by the second data processing device and an acquisition completion scheduled time of the content in the process of being acquired by the second data processing device; and
    calculating a period of time needed to acquire the content from the second data processing device based on the schedule data, a size of the content, and a communication state with the second data processing device.

3. The non-transitory recording medium of claim 2, the process further comprising:
    holding the schedule data received from the second data processing device for a specific period of time.

4. The non-transitory recording medium of claim 2, the process further comprising:
    based on the received schedule data, excluding a second data processing device that has transmitted schedule data a specific number of times or more within a specific duration, from the data processing devices from which to acquire the content.

5. The non-transitory recording medium of claim 1, wherein the period of time needed to acquire the content from the first data processing device is calculated based on data of content shared by a group pre-stored in a storage section, a size of the content, and data of a first data processing device that holds the content.

6. The non-transitory recording medium of claim 1, wherein the group data is acquired from data of a connection time occurring prior to a user requesting the content.

7. The non-transitory recording medium of claim 1, wherein, when selecting the data processing device from which to acquire the content, a data processing device having a smallest number of hops to the first data processing device or the second data processing device is selected from the first data processing devices and the second data processing devices having a period of time needed to acquire the content of a specific period of time or shorter.

8. The non-transitory recording medium of claim 1, the process further comprising:
    transmitting schedule data, including data of content in the process of being acquired and an acquisition completion scheduled time of the content in the process of being acquired.

9. The non-transitory recording medium of claim 8, wherein the schedule data is transmitted from a given device to a data processing device having a communication speed with the given device of a specific value or greater, or to a data processing device having a number of hops to the given device of a specific number or lower.

10. A content acquisition device, comprising:
    a processor configured to execute a process, the process comprising:
    acquiring group data to identify a group that a user belongs to;
    based on a period of time needed to acquire content from each of a first data processing device that holds content shared by the group indicated by the group data, and a second data processing device that is in the process of acquiring the content from the first data processing device, selecting a data processing device from which to acquire the content, from the first data processing device and the second data processing device; and
    acquiring the content from the selected data processing device.

11. The content acquisition device of claim 10, the process further comprising:
    receiving, from the second data processing device, schedule data, including data of content in the process of being acquired by the second data processing device and an acquisition completion scheduled time of the content in the process of being acquired by the second data processing device; and
    calculating a period of time needed to acquire the content from the second data processing device based on the schedule data, a size of the content, and a communication state with the second data processing device.

12. The content acquisition device of claim 11, the process further comprising:
    holding the schedule data received from the second data processing device for a specific period of time.

13. The content acquisition device of claim 11, the process further comprising:
    based on the received schedule data, excluding a second data processing device that has transmitted schedule data a specific number of times or more within a specific duration, from the data processing devices from which to acquire the content.

14. The content acquisition device of claim 10, wherein the period of time needed to acquire the content from the first data processing device is calculated based on data of content shared by a group pre-stored in a storage section, a size of the content, and data of a first data processing device that holds the content.

15. The content acquisition device of claim 10, wherein the group data is acquired from data of a connection time occurring prior to a user requesting the content.

16. The content acquisition device of claim 10, wherein, when selecting the data processing device from which to acquire the content, a data processing device having a smallest number of hops to the first data processing device or the second data processing device is selected from the first data processing devices and the second data processing devices having a period of time needed to acquire the content of a specific period of time or shorter.

17. The content acquisition device of claim 10, the process further comprising:
  transmitting schedule data, including data of content in the process of being acquired and an acquisition completion scheduled time of the content in the process of being acquired by the content acquisition section.

18. The content acquisition device of claim 17, wherein the schedule data is transmitted to a data processing device having a communication speed with the content acquisition device of a specific value or greater, or to a data processing device having a number of hops to the content acquisition device of a specific number or lower.

19. A content acquisition method comprising:
  acquiring group data to identify a group that a user belongs to;
  by a processor, based on a period of time needed to acquire content from each of a first data processing device that holds content shared by the group indicated by the group data, and a second data processing device that is in the process of acquiring the content from the first data processing device, selecting a data processing device from which to acquire the content, from the first data processing device and the second data processing device; and
  acquiring the content from the selected data processing device.

20. The content acquisition method of claim 19, further comprising:
  receiving, from the second data processing device, schedule data, including data of content in the process of being acquired by the second data processing device and an acquisition completion scheduled time of the content in the process of being acquired by the second data processing device; and
  calculating a period of time needed to acquire the content from the second data processing device based on the schedule data, a size of the content, and a communication state with the second data processing device.

* * * * *